(12) United States Patent
Kurabuchi et al.

(10) Patent No.: US 11,559,740 B2
(45) Date of Patent: Jan. 24, 2023

(54) VIDEO MODIFICATION AND TRANSMISSION USING TOKENS

(71) Applicant: GREE, Inc., Tokyo (JP)

(72) Inventors: Aya Kurabuchi, Tokyo (JP); Yushi Takagi, Tokyo (JP); Shuhei Asada, Tokyo (JP); Yosuke Kanaya, Tokyo (JP); Shigeki Nakamura, Tokyo (JP); Takahiro Fukumoto, Tokyo (JP); Kaoru Murakami, Japan (JP); Naoki Takahashi, Japan (JP); Kenta Sagara, Tokyo (JP)

(73) Assignee: GREE, Inc., Tokyo (JP)

( * ) Notice: Subject to any disclaimer, the term of this patent is extended or adjusted under 35 U.S.C. 154(b) by 183 days.

(21) Appl. No.: 17/017,636

(22) Filed: Sep. 10, 2020

(65) Prior Publication Data

US 2021/0077905 A1 Mar. 18, 2021

(30) Foreign Application Priority Data

Sep. 13, 2019 (JP) .............................. JP2019-166968
Sep. 13, 2019 (JP) .............................. JP2019-166969
(Continued)

(51) Int. Cl.
*A63F 13/53* (2014.01)
*A63F 13/56* (2014.01)
(Continued)

(52) U.S. Cl.
CPC .............. *A63F 13/53* (2014.09); *A63F 13/56* (2014.09); *G06T 13/40* (2013.01); *G06T 13/80* (2013.01); *H04N 21/816* (2013.01)

(58) Field of Classification Search
CPC .......... A63F 13/45; A63F 13/46; A63F 13/86; A63F 13/87; A63F 2300/577
See application file for complete search history.

(56) References Cited

U.S. PATENT DOCUMENTS 9,814,987 B1* 11/2017 Lawson .................. A63F 13/65
10,130,890 B2 11/2018 Oshima et al.
(Continued)

FOREIGN PATENT DOCUMENTS

JP 2012-034792 A 2/2012
JP 6378849 B1 8/2018
(Continued)

OTHER PUBLICATIONS

Office Action (with English translation) issued in Japanese Patent Application No. 2020-184501, dated Dec. 21, 2021, 4 pages.
(Continued)

*Primary Examiner* — Lawrence S Galka
(74) *Attorney, Agent, or Firm* — Klarquist Sparkman, LLP

(57) ABSTRACT

Computer-readable storage media are disclosed storing instructions, which when executed, cause a processor to: distribute, toward a terminal device of a viewer via a communication line, a first video including an animation of a first avatar of a distributor generated on the basis of motion data or the motion data; distribute, toward the terminal device of the viewer via the communication line, a second video related to a game generated on the basis of operation data by using a received web page; receive, from the terminal device of the viewer via the communication line, token data indicative of providing a token to the distributor from the viewer viewing the second video; and distribute, toward the terminal device of the viewer via the communication line, the second video including a game object set on the basis of the token data.

32 Claims, 15 Drawing Sheets

(30) Foreign Application Priority Data

Sep. 13, 2019 (JP) .............................. JP2019-166970
Sep. 13, 2019 (JP) .............................. JP2019-166971

(51) Int. Cl.

| G06T 13/40 | (2011.01) |
|---|---|
| G06T 13/80 | (2011.01) |
| H04N 21/81 | (2011.01) |

(56) References Cited

U.S. PATENT DOCUMENTS

| 11,044,535 | B2 | 6/2021 | Kurabuchi | |
|---|---|---|---|---|
| 11,065,540 | B2 | 7/2021 | Chino | |
| 2003/0220143 | A1* | 11/2003 | Shteyn | A63F 13/86 463/42 |
| 2007/0268312 | A1* | 11/2007 | Marks | A63F 13/65 345/633 |
| 2008/0001951 | A1* | 1/2008 | Marks | A63F 13/79 463/31 |
| 2009/0328122 | A1* | 12/2009 | Amento | A63F 13/63 725/114 |
| 2016/0006772 | A1* | 1/2016 | Shimizu | H04L 12/1827 709/204 |
| 2016/0286275 | A1 | 9/2016 | Maeda et al. | |
| 2017/0003740 | A1* | 1/2017 | Verfaillie | A63F 13/87 |
| 2017/0011554 | A1* | 1/2017 | Burba | G06T 15/20 |
| 2017/0072324 | A1* | 3/2017 | Navok | A63F 13/847 |
| 2018/0093185 | A1* | 4/2018 | Black | A63F 13/86 |
| 2019/0099675 | A1* | 4/2019 | Khan | A63F 13/5255 |
| 2019/0102929 | A1 | 4/2019 | Davis et al. | |
| 2020/0005541 | A1* | 1/2020 | Preston | A63F 13/792 |
| 2020/0023280 | A1* | 1/2020 | Onda | A63F 13/35 |
| 2020/0077157 | A1 | 3/2020 | Kurabuchi | |
| 2021/0152894 | A1 | 5/2021 | Kurabuchi | |

FOREIGN PATENT DOCUMENTS

| JP | 2018-171283 | A | 11/2018 |
|---|---|---|---|
| JP | 6491388 | B1 | 3/2019 |
| JP | 2019-54838 | A | 4/2019 |
| JP | 2019-054838 | A | 4/2019 |
| JP | 2019-103596 | A | 6/2019 |
| JP | 2019-118656 | A | 7/2019 |
| WO | WO-2018142494 | A1 | 9/2018 |

OTHER PUBLICATIONS

GAPSIS editorial staff, The games users are able to play by operating their avatars with LINE will be launched (with English translation), May 17, 2013, 7 pages.

Mirrative—Game distribution & game commentary & game recording (with its English translation); downloaded on Nov. 10, 2020, 7 pages.

Mirrative—A gift function has been launched! (with English translation), downloaded Dec. 14, 2018, 8 pages.

Office Action (OA) dated Oct. 6, 2020, for priority application (JP Pat. Appl. No. 2019-166968) together with its English machine translation, 6 pages.

Office Action (OA) dated Oct. 6, 2020, for priority application (JP Pat. Appl. No. 2019-166971) together with its English machine translation, 7 pages.

"AKIBA's TRIP2 'Demo Mode'", document dated Jun. 24, 2014, downloaded from https://www.famitsu.com/news/201406/24055841.html on Aug. 24, 2021.

GAPSIS editorial department, "The games users are able to play by operating their avatars with LINE will be launched," downloaded from https://www.gapsis.jp/2013/05/line-turitomo.html, 7 pp., May 17, 2013 (English translation attached.).

"Let's All Participate in the World of Arisugawa Dot!," document dated Jan. 13, 2019, downloaded from https://jonasan72.hatenablog.com/entry/2019/01/13/165838 on Aug. 25, 2021.

Mirrativ, Inc., "A gift function has been launched!," downloaded from https://web.archive.org/web/20181214025245/https://mirrativtmbr.tumblr.com/post/178631446973/ギフト機能がはじまります, 8 pp., Dec. 14, 2018 (English translation attached.).

Mirrativ, Inc., "Game distribution & game commentary & game recording," downloaded from https://apps.apple.com/jp/app/mirrativ-ミラティブ-スマホでかんたんゲーム配信/id1028944599, 7 pp., Nov. 10, 2020 (English translation attached.).

Notice of Reasons for Refusal dated Oct. 6, 2020 for Japanese Patent Application No. 2019-166968, 6 pp. (English translation attached.).

Notice of Reasons for Refusal dated Oct. 6, 2020 for Japanese Patent Application No. 2019-166971, 7 pp. (English translation attached.).

Notice of Reasons for Refusal dated Jan. 12, 2021 for Japanese Patent Application No. 2019-202987, 8 pp. (English translation attached.).

Office action (with English Translation) issued in JP 2019-202987, dated Aug. 10, 2021, 7 pages.

Reality Administration Bureau, "Flappin' Avatar," downloaded from https://reality-notice.wrightflyer.net/aba0a23e90b9c3df9c819fc58bd39f09a0452aac.html, 5 pp., Apr. 1, 2019 (English translation attached.).

* cited by examiner

| TARGET: SHOOTER GAME 1 | | |
|---|---|---|
| RANKING | DISTRIBUTOR NAME | TOTAL POINT |
| 1 | C | 11025 |
| 2 | E | 8898 |
| 3 | B | 7751 |
| 4 | D | 7555 |
| 5 | A | 6521 |

FIG. 12A

| TARGET: LEVEL 5 OF SHOOTER GAME 1 | | |
|---|---|---|
| RANKING | DISTRIBUTOR NAME | TOTAL POINT |
| 1 | H | 180 |
| 2 | G | 155 |
| 3 | F | 143 |
| 4 | J | 120 |
| 5 | I | 115 |

FIG. 12B

| TARGET: SEPTEMBER 2019 | | |
|---|---|---|
| RANKING | DISTRIBUTOR NAME | TOTAL POINT |
| 1 | L | 54221 |
| 2 | M | 51102 |
| 3 | K | 44331 |
| 4 | O | 41002 |
| 5 | N | 25252 |

FIG. 12C

| TARGET: SHOOTER GAME 2 DISTRIBUTED BY DISTRIBUTOR | | |
|---|---|---|
| RANKING | VIEWER NAME | TOTAL POINT |
| 1 | S | 521 |
| 2 | R | 314 |
| 3 | Q | 115 |
| 4 | U | 108 |
| 5 | T | 101 |

FIG. 13A

| TARGET: LEVEL 9 OF SHOOTER GAME 3 DISTRIBUTED BY DISTRIBUTOR A | | |
|---|---|---|
| RANKING | VIEWER NAME | TOTAL POINT |
| 1 | V | 112 |
| 2 | W | 105 |
| 3 | X | 89 |
| 4 | Z | 73 |
| 5 | Y | 52 |

FIG. 13B

| TARGET: SEPTEMBER 2019 | | |
|---|---|---|
| RANKING | VIEWER NAME | TOTAL POINT |
| 1 | B | 5223 |
| 2 | A | 3143 |
| 3 | D | 1533 |
| 4 | C | 1298 |
| 5 | E | 987 |

FIG. 13C

218# VIDEO MODIFICATION AND TRANSMISSION USING TOKENS

CROSS-REFERENCE TO RELATED APPLICATIONS

This application claims priority to Japanese Patent Application No. 2019-166968, filed on Sep. 13, 2019; Japanese Patent Application No. 2019-166969, filed on Sep. 13, 2019; Japanese Patent Application No. 2019-166970, filed on Sep. 13, 2019; and Japanese Patent Application No. 2019-166971, filed on Sep. 13, 2019, all entitled "Computer Program, Server Device, Terminal Device, and Method." These applications are incorporated herein by reference in their entirety as if set forth fully herein.

FIELD

The technology disclosed in the present application relates to a computer program, a server device, a terminal device, and a method that are used for distributing a video related to a game from a terminal device of a distributor to a terminal device of a viewer.

BACKGROUND

One example of a service used for distributing a video related to a computer game is known a service called mirrativ provided on a website identified by the following URL.
  https://apps.apple.com/jp/app/mirrativ-ミラティブ-
    スマホでかんたん ゲーム配信 id1028944599
With this service, the distributor uses a terminal device to distribute, to the terminal devices of a plurality of viewers, a video including an animation of an avatar generated on the basis of motion data related to the motion of the distributor.

SUMMARY

Method and apparatus for distributing and modifying video in a networked computer environment are disclosed. In some examples of a video streaming service used with computer games, each viewer can exchange data with a distributor including game metadata, comments, video data, audio data, image data, location data, and/or video or game commands. Each viewer can also determine to transmit one or more messages or packets encoded with one or more tokens to the distributor. In the disclosed technology field, such tokens may also be referred to as elective tokens or "gifts." Similarly, token data may be referred to as "gift data." However, the token data and such token packets transmitted by each viewer to the distributor in this way do not affect elements used in the game played and distributed by the distributor, such as game objects or parameters. Therefore, it is difficult for each viewer to have a sense of being involved in the game when viewing video related to the game distributed from the distributor.

Accordingly, one aspect of the disclosed technology provides a computer program, a terminal device, a server device, and a method that can provide a viewer with a sense of being involved in a game. Methods and apparatus are disclosed for modifying and distributing video in a computer network responsive to transmission of token messages transmitted from one or more viewers to a distributor. The viewers can receive video streams or other game elements having modified encodings based on the tokens the viewers elected to transmit. As will be understood to a person of ordinary skill in the art having the benefit of the present disclosure, viewers can elect to send such tokens to indicate a message to the distributor, for example, appreciation or respect for the distributor. Examples of practical applications of the disclosed technologies include but are not limited to: video encoding and transcoding, audio coding and transcoding, and/or enhancement of computer games implemented in a network environment modified responsive to the distributor receiving the token.

A computer program according to one aspect of the disclosed technology can be a "computer program for causing, by being executed by at least one processor, the processor to function so as to: distribute, toward a terminal device of a viewer via a communication line, a first video including an animation of a first avatar of a distributor generated on the basis of motion data or the motion data; distribute, toward the terminal device of the viewer via the communication line, a second video related to a computer-implemented game generated on the basis of operation data by using a received web page; receive, from the terminal device of the viewer via the communication line, a signal encoding token data to the distributor from the viewer viewing the second video; and distribute, toward the terminal device of the viewer via the communication line, the second video including a game object set on the basis of the token data."

A terminal device according to one aspect of the disclosed technology can be a "terminal device, comprising: at least one processor, wherein the processor distributes, toward a terminal device of a viewer via a communication line, a first video including an animation of a first avatar of a distributor generated on the basis of motion data or the motion data, distributes, toward the terminal device of the viewer via the communication line, a second video related to a computer-implemented game generated on the basis of operation data by using a received web page, receives, from the terminal device of the viewer via the communication line, token data indicative of providing a token to the distributor from the viewer viewing the second video, and distributes, toward the terminal device of the viewer via the communication line, the second video including a game object set on the basis of the token data."

A method according to one aspect of the disclosed technology can be a "method executed by at least one processor that executes computer-readable instructions, comprising: a first distribution step of distributing, toward a terminal device of a viewer via a communication line, a first video including an animation of a first avatar of a distributor generated on the basis of motion data or the motion data; a second distribution step of distributing, toward the terminal device of the viewer via the communication line, a second video related to a computer-implemented game generated on the basis of operation data by using a received web page; a step of receiving, from the terminal device of the viewer via the communication line, token data indicative of providing a token to the distributor from the viewer viewing the second video; and a third distribution step of distributing, toward the terminal device of the viewer via the communication line, the second video including a game object set on the basis of the token data."

A server device according to one aspect of the disclosed technology can be a "server device, comprising: at least one processor, wherein the processor distributes, to a terminal device of a viewer via a communication line, a first video including an animation of a first avatar of a distributor generated on the basis of motion data or the motion data, distributes, to the terminal device of the viewer via the communication line, a second video related to a computer-implemented game generated by a terminal device of the distributor on the basis of operation data by using a received web page, receives, from the terminal device of the viewer via the communication line, token data indicative of providing a token to the distributor from the viewer viewing the second video, and distributes, to the terminal device of the viewer via the communication line, the second video distributed by the terminal device of the distributor including a game object set on the basis of the token data."

A method according to another aspect of the disclosed technology can be a "method executed by at least one processor that executes computer-readable instructions, comprising: a first distribution step of distributing, to a terminal device of a viewer via a communication line, a first video including an animation of a first avatar of a distributor generated on the basis of motion data or the motion data; a second distribution step of distributing, to the terminal device of the viewer via the communication line, a second video related to a computer-implemented game generated by a terminal device of the distributor on the basis of operation data by using a received web page; a step of receiving, from the terminal device of the viewer via the communication line, token data indicative of providing a token to the distributor from the viewer viewing the second video; and a third distribution step of distributing, to the terminal device of the viewer via the communication line, the second video distributed by the terminal device of the distributor including a game object set on the basis of the token data."

A server device according to another aspect of the disclosed technology can be a "server device, comprising: at least one processor, wherein the processor transmits a web page including a computer program via a communication line to a terminal device of a distributor, wherein that the terminal of the distributor is configured to distribute, toward a terminal device of a viewer via the communication line, a first video including an animation of a first avatar of the distributor generated on the basis of motion data or the motion data, and to distribute, toward the terminal device of the viewer via the communication line, a second video related to a computer-implemented game generated on the basis of operation data by using a received web page, and wherein the computer program causes the terminal device of the distributor to function so as to receive, from the terminal device of the viewer via the communication line, token data indicative of providing a token to the distributor from the viewer viewing the second video, and generate the second video including a game object set on the basis of the token data."

A method according to another aspect of the disclosed technology can be a "method executed by at least one processor that executes computer-readable instructions, comprising: a step of transmitting a web page including a computer program via a communication line to a terminal device of a distributor that is configured to distribute, toward a terminal device of a viewer via the communication line, a first video including an animation of a first avatar of the distributor generated on the basis of motion data or the motion data, and to distribute a second video related to a computer-implemented game generated on the basis of operation data by using a received web page, wherein the computer program causes the terminal device of the distributor to function so as to receive, from the terminal device of the viewer via the communication line, token data indicative of providing a token to the distributor from the viewer viewing the second video, and generate the second video including a game object set on the basis of the token data."

A computer program according to another aspect of the disclosed technology can be a "computer program for causing, by being executed by at least one processor, the processor to function so as to: receive, from a terminal device of a distributor, a first video including an animation of a first avatar of a distributor generated on the basis of motion data or the motion data; receive, from the terminal device of the distributor via the communication line, a second video related to a computer-implemented game generated on the basis of operation data by using a received web page; send, to the terminal device of the distributor via the communication line, token data indicative of providing a token to the distributor; and receive, from the terminal device of the distributor via the communication line, the second video including a game object set on the basis of the token data."

A terminal device according to another aspect of the disclosed technology can be a "terminal device, comprising: at least one processor, wherein the processor receives, from a terminal device of a distributor, a first video including an animation of a first avatar of a distributor generated on the basis of motion data or the motion data; receives, from the terminal device of the distributor via the communication line, a second video related to a computer-implemented game generated on the basis of operation data by using a received web page; sends, to the terminal device of the distributor via the communication line, token data indicative of providing a token to the distributor; and receives, from the terminal device of the distributor via the communication line, the second video including a game object set on the basis of the token data."

A method according to another aspect of the disclosed technology can be a "method executed by at least one processor that executes computer-readable instructions, comprising: receiving, from a terminal device of a distributor, a first video including an animation of a first avatar of a distributor generated on the basis of motion data or the motion data; receiving, from the terminal device of the distributor via the communication line, a second video related to a computer-implemented game generated on the basis of operation data by using a received web page; sending, to the terminal device of the distributor via the communication line, token data indicative of providing a token to the distributor; and receiving, from the terminal device of the distributor via the communication line, the second video including a game object set on the basis of the token data."

This Summary is provided to introduce a selection of concepts in a simplified form that are further described below in the Detailed Description. All trademarks used herein remain the property of their respective owners. This Summary is not intended to identify key features or essential features of the claimed subject matter, nor is it intended to be used to limit the scope of the claimed subject matter. The foregoing and other objects, features, and advantages of the disclosed subject matter will become more apparent from the following Detailed Description, which proceeds with reference to the accompanying figures.

BRIEF DESCRIPTION OF THE DRAWINGS

FIG. 12A is a table showing an example of first ranking data generated and displayed by the video distribution system shown in FIG. 1.

FIG. 12B is a table showing another example of the first ranking data generated and displayed by the video distribution system shown in FIG. 1.

FIG. 12C is a table showing still another example of the first ranking data generated and displayed by the video distribution system shown in FIG. 1.

FIG. 13A is a table showing an example of second ranking data generated and displayed by the video distribution system shown in FIG. 1.

FIG. 13B is a table showing another example of the second ranking data generated and displayed by the video distribution system shown in FIG. 1.

FIG. 13C is a table showing still another example of the second ranking data generated and displayed by the video distribution system shown in FIG. 1.

DETAILED DESCRIPTION

Figure 1:
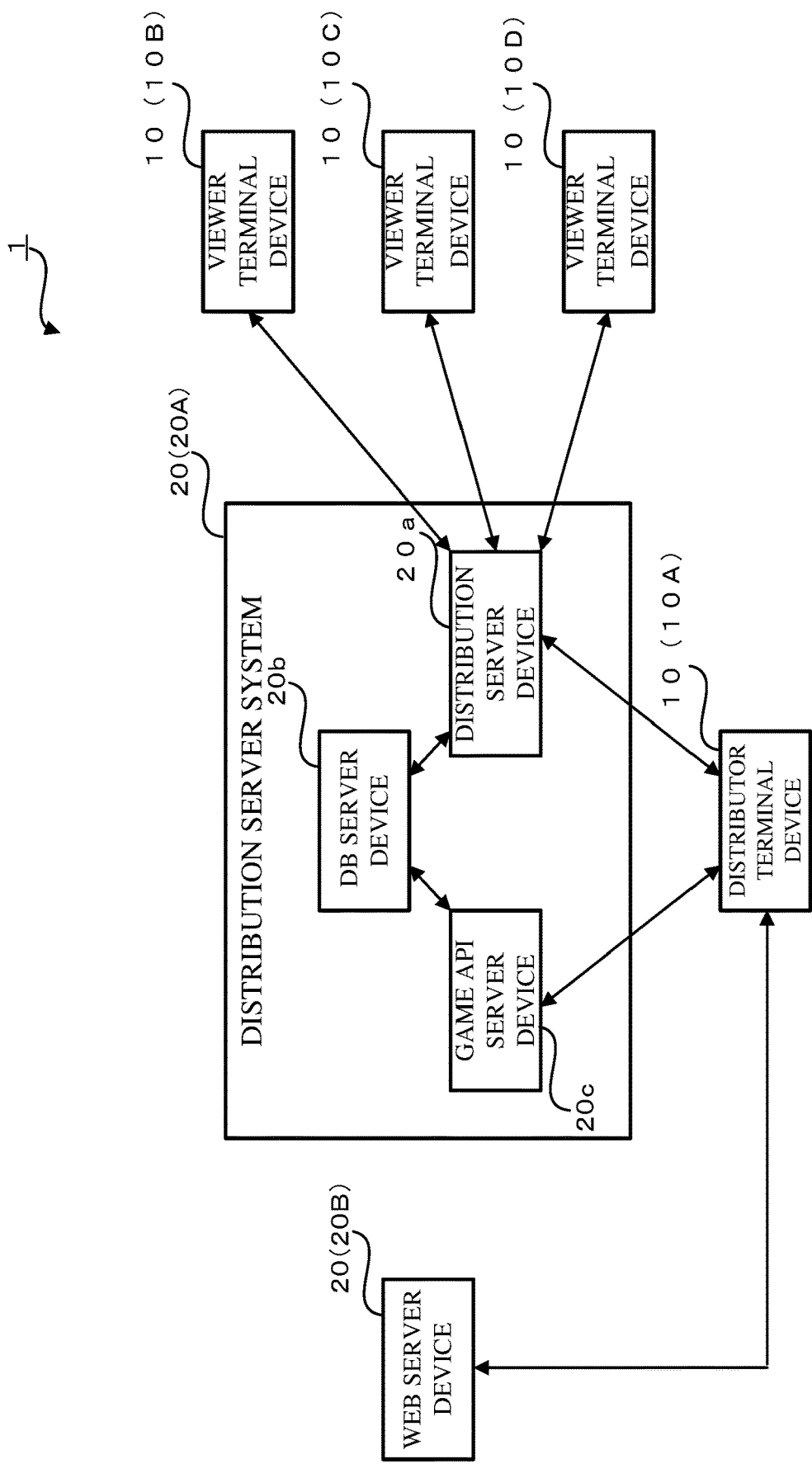
FIG. 1 is a block diagram showing an example of a configuration of a video distribution system according to an embodiment.

This disclosure is set forth in the context of representative embodiments that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel features and aspects of the various disclosed embodiments, alone and in various combinations and subcombinations with one another. The disclosed systems, methods, and apparatus are not limited to any specific aspect or feature or combinations thereof, nor do the disclosed things and methods require that any one or more specific advantages be present or problems be solved. Furthermore, features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "display," "receive," "evaluate," and "distribute" to describe the disclosed methods. These terms are high-level descriptions of the actual operations that are performed. The actual operations that correspond to these terms will vary depending on the particular implementation and are readily discernible by one of ordinary skill in the art having the benefit of the present disclosure.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented using computer-executable instructions stored on one or more computer-readable media (e.g., non-transitory computer-readable storage media, such as one or more optical media discs, volatile memory components (such as DRAM or SRAM), or nonvolatile memory components (such as hard drives and solid state drives (SSDs))) and executed on a computer (e.g., any commercially available computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., non-transitory computer-readable storage media). The computer-executable instructions can be part of, for example, a dedicated software application, or a software application that is accessed or downloaded via a web browser or other software application (such as a remote computing application). Such software can be executed, for example, on a single local computer (e.g., as an agent executing on any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

As will be described in further detail herein, certain examples of the disclosed technology can be used in a networked video transmission system to provide interactive applications, such as games, social media, and other forms of interactive communication. In some examples, token data can be transmitted from a viewer terminal device to a distributor terminal device operating concurrently to provide an interactive application. A server at the distributor, or the distributor terminal device itself, can process the data to render modified video data that is encoded and sent to the viewer terminal device. This allows for interactive applications to be processed at the distributor, which can reduce the amount of computing resources required at the viewer terminal devices to render the modified video data locally. Further, in some examples, the modified video data is transmitted not just to the viewer device that sent token data, but can also be transmitted to other viewer devices participating in the interactive application. This can further reduce computing resources required at each of the additional viewer devices or allow for more extensive effects to be added to the transmitted video. In addition, certain disclosed techniques allow security and maintenance operations associated with interactive applications such as game programs to be performed at the distributor, further reducing complexity of the application.

1. Configuration of Video Distribution System

Examples of video distribution systems disclosed in the present application enable a user who performs video distribution over a computer network (hereinafter referred to as "distributor") to transmit (or "distribute"), by using a terminal device of the distributor, a first video including an animation of a first avatar generated on the basis of motion data generated by motion capture of video or other image data captured of the distributor and a second video related to a computer-implemented game generated on the basis of operation data related to the operation of the distributor to a terminal device of a user who views the videos (hereinafter referred to as "viewer") via a computer network communication line. Transmission via the communication line can include wired and/or wireless forms of signal transmission.

FIG. 1 is a block diagram showing an example of the configuration of the video distribution system according to an embodiment. As shown in FIG. 1, the video distribution system 1 can include a plurality of terminal devices 10 connected to a communication line (not shown), and one or more server devices 20 connected to a communication line. Each terminal device 10 is connected to one or more server devices 20 via a communication line (not shown).

1-1. Terminal Device 10

The plurality of terminal devices 10 can include one or more distributor terminal devices 10 (here, a terminal device 10A) and one or more viewer terminal devices 10 of a viewer (here, a terminal device 10B to a terminal device 10D). Each terminal device 10 can have a common configuration and thus may include a terminal device (distributor terminal device 10) for distributing a video and/or a terminal device (viewer terminal device 10) for viewing a video.

When operating as a terminal device (distributor terminal device) for distributing a video, each terminal device 10 can execute an installed video distribution application. This allows each terminal device 10 to acquire motion data related to the motion of the distributor and transmit, to the server device 20 (distribution server system 20A) via a communication line, a first video including an animation of a virtual character (first avatar) changed according to the acquired data. For example, the motion data can be acquired using a motion capture system. As will be readily understood to one of ordinary skill in the art having the benefit of the present disclosure, examples of suitable motion capture systems that can be used with disclosed apparatus and methods include optical motion capture systems, including such systems using passive markers, active markers, or markerless systems and non-optical systems, including inertial and magnetic systems. Motion data can be capture with an image capture devices (such as a CCD (charge-coupled device) or CMOS (complementary metal oxide semiconductor) image sensor) coupled to a computer that transforms the motion data into video or other image data. First video data generated using the motion capture system is distributed by the server device 20 (distribution server system 20A) via a communication line to a terminal device (viewer terminal device) 10 for receiving a video which executes an installed video viewing application. In this specification, the video distribution application installed in each terminal device 10 may be middleware or a combination of an application and middleware. Similarly, the video viewing application installed in each terminal device 10 may be middleware or a combination of an application and middleware.

When operating as a distributor terminal device, each terminal device 10 can execute a browser function incorporated in the installed video distribution application and/or execute an installed web browser application. This allows each terminal device 10 to receive a web page (for example, an HTML document, including in some examples, HTML documents encoding executable code such as JavaScript or PHP code) from the server device 20 (web server device 20B) and execute a computer-implemented game program included in this web page. By executing the game program, each terminal device 10 can generate a second video in which at least one game object is caused to act on the basis of operation data related to the operation of the distributor. This game object can include a game object including a virtual character (second avatar) of the distributor acting on the basis of the operation data.

When operating as a distributor terminal device, each terminal device 10 can transmit, by executing the video distribution application, the second video thus generated to the server device 20 (distribution server system 20A) via the communication line. Such the second video is also distributed by the server device 20 (distribution server system 20A) via a communication line to a terminal device (viewer terminal device) 10 for receiving a video which executes an installed video viewing application.

Furthermore, when operating as a distributor terminal device, each terminal device 10 can execute the video distribution application. This allows each terminal device 10 to receive via the communication line from the terminal device 10 of the viewer who views the second video (distributed by the distributor terminal device 10) via the server device 20 (distribution server system 20A), a token to the distributor and/or comment data indicative of transmitting a comment to the distributor. For example, the token can encode data indicative of a virtual gift transmitted to the distributor.

On the other hand, when operating as a terminal device (viewer terminal device) for viewing a video, each terminal device 10 can execute an installed video viewing application. This allows each terminal device 10 to receive, via the server device 20 (distribution server system 20A), the first video and/or the second video distributed by the distributor terminal device 10.

Furthermore, when operating as a viewer terminal device, each terminal device 10 can execute the video viewing application. This allows each terminal device 10 to transmit tokens to the distributor and/or comment data indicative of transmitting a comment to the distributor to the distributor terminal device via the server device 20 (distribution server system).

Additionally, the above-described video distribution application and video viewing application can be installed and executed in each terminal device 10 as one integrated application or as separate applications.

Each terminal device 10 can be any terminal device capable of executing such an operation. For example, each terminal device 10 can include at least one of: a smartphone, a tablet, a mobile phone (feature phone), or a personal computer, without being limited thereto.

1-2. Server Device 20

FIG. 1 shows a distribution server system 20A and a web server device 20B as an example of one or more server devices 20.

The distribution server system 20A can distribute the first video and/or the second video transmitted by each terminal device (each distributor terminal device) 10 to each terminal device (each viewer terminal device) 10. Furthermore, the distribution server system 20A can transmit, to the terminal device 10 of a certain distributor, tokens and/or comment data to the distributor that have been transmitted by each terminal device (each viewer terminal device) 10.

In order to execute such operation, the distribution server system 20A, in one embodiment, can include a distribution server device 20a, a database (DB) server device 20b, and a game API server device 20c that are interconnected via a communication line (including a wireless line and/or a wired line that are not shown).

The distribution server device 20a can distribute, to each terminal device 10, the first video and/or the second video transmitted by the terminal device 10 of each distributor. Furthermore, the distribution server device 20a can store, into the DB server device 20b, token data and/or comment data transmitted by the terminal device 10 of each viewer.

The DB server device 20b can store token data or comment data received from the distribution server device 20a, read token data and/or comment data inquired by the game API server device 20c, and transmit them to the game API server device 20c.

When receiving an inquiry about token data and/or comment data from the terminal device 10 of each distributor, the game API server device 20c can read, from the DB server device 20b, token data and/or comment data for the terminal device 10 of the distributor, and transmit them to the terminal device 10 of the distributor.

The example shown in FIG. 1 outlines a configuration in which the distribution server system 20A has three server devices including the distribution server device 20a, the DB server device 20b, and the game API server device 20c for the purpose of balancing the load. However, at least one of the three server devices can be integrated with any of the remaining server devices.

Next, the web server device 20B can transmit, to the terminal device 10 of each distributor having accessed, a web page (document created according to HTML, for example, HTML5) in which a game program is incorporated. By being executed by the terminal device 10 having received and decoded this game program, the game program can cause the terminal device 10 to execute at least one of various operations related to distribution of a video as exemplified below:

Operation of executing the game;

Operation of transmitting, to the distribution server system 20A (distribution server device 20a), a game screen generated in accordance with execution of the game; and/or Operation of acquiring token data and/or comment data transmitted to this distributor from the distribution server system 20A (game API server device 20c).

1-3. Communication Line

The communication line (not shown) can include a mobile telephone network, a wireless network (e.g., RF connections via Bluetooth, WiFi (such as IEEE 802.11a/b/n), WiMax, cellular, satellite, laser, infrared), a fixed telephone network, the Internet, an intranet, a local area network (LAN), a wide-area network (WAN), and/or an Ethernet network, without being limited thereto. In a virtual host environment, the communication line(s) can be a virtualized network connection provided by the virtual host.

2. Hardware Configuration of Each Device

Next, an example of the hardware configuration of each of the terminal device 10 and the server device 20 will be described.

2-1. Hardware Configuration of Terminal Device 10

Figure 2:
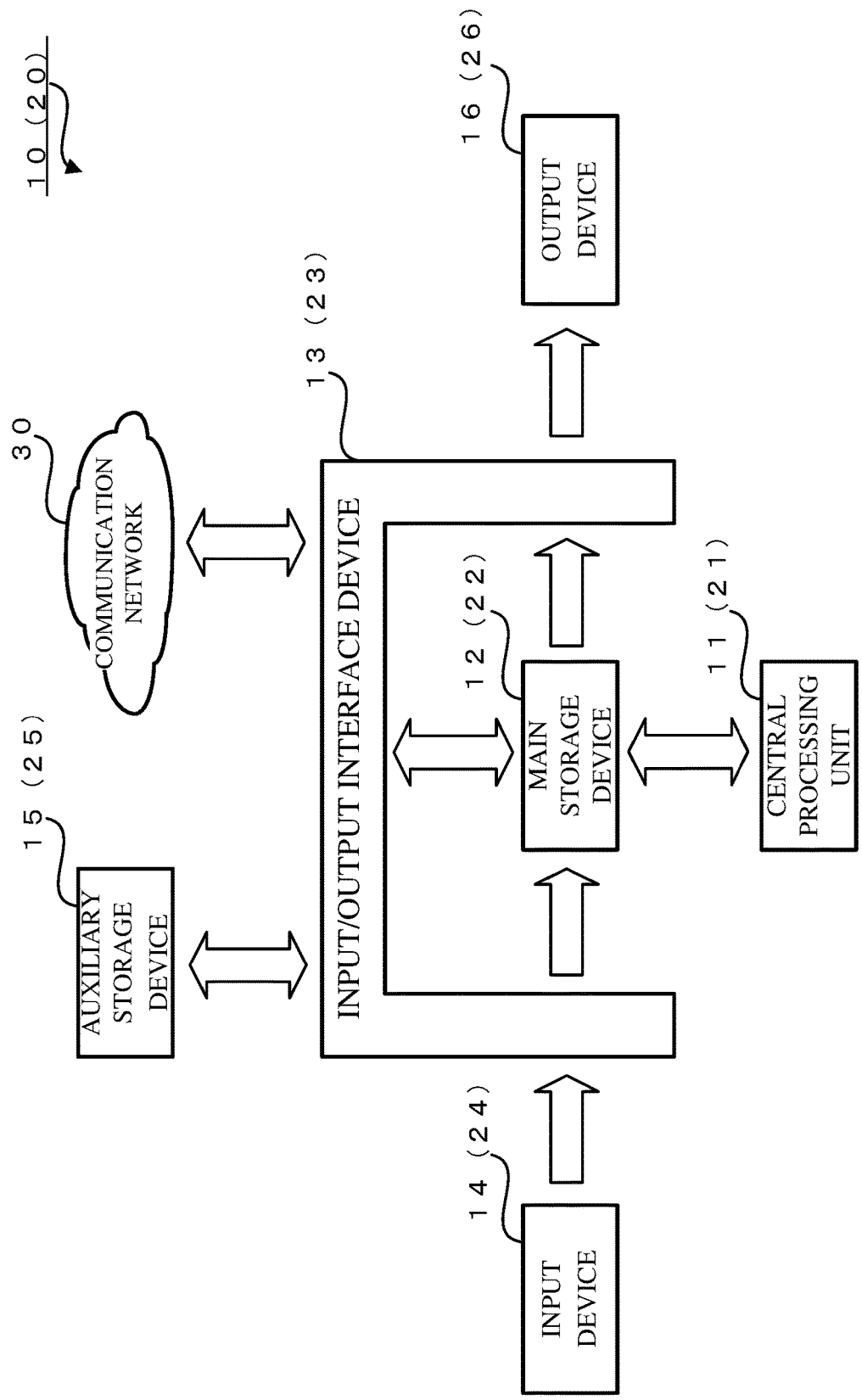
FIG. 2 is a block diagram schematically showing an example of a hardware configuration of a terminal device (server device) shown in FIG. 1.

An example of the hardware configuration of each terminal device 10 will be described with reference to FIG. 2. FIG. 2 is a block diagram schematically showing an example of the hardware configuration of the terminal device 10 (server device 20) shown in FIG. 1. (In FIG. 2, reference numerals in parentheses refer to the server device 20 as described later.)

As shown in FIG. 2, each terminal device 10 can mainly include a processor, for example, a central processing unit 11, a main storage device 12, an input/output interface device 13, an input device 14, an auxiliary storage device 15, and an output device 16. These devices are interconnected via a data bus and/or a control bus. The processor may be a real or virtual processor.

The central processing unit 11, which is referred to as a "CPU," can perform operations on instructions and data stored in the main storage device 12, and store the results of the operations in the main storage device 12. Furthermore, the central processing unit 11 can control and receive data from the input device 14, the auxiliary storage device 15, the output device 16, and the like via the input/output interface device 13. The terminal device 10 can include one or more such central processing units 11.

The main storage device 12, which is referred to as a "memory", can store instructions and data received from the input device 14, the auxiliary storage device 15, and a communication line 30 (server device 20 or the like) via the input/output interface device 13, as well as calculation results of the central processing unit 11. The main storage device 12 can include computer-readable media such as volatile memory (e.g., registers, cache, random access memory (RAM)), non-volatile memory (e.g., read-only memory (ROM), EEPROM, flash memory) and storage (e.g., a hard disk drive (HDD), solid-state drive (SSD), magnetic tape, optical media), without being limited thereto. As should be readily understood, the term computer-readable storage media includes the media for data storage such as memory and storage, and not transmission media such as modulated data signals or transitory signals.

The auxiliary storage device 15 is a storage device typically having a capacity larger than that of the main storage device 12. It is possible to store instructions and data (computer programs) constituting the above-described specific applications (video distribution application, video viewing application, and the like), web browser applications, and the like. By being controlled by the central processing unit 11, the auxiliary storage device 15 can transmit these instructions and data (computer programs) to the main storage device 12 via the input/output interface device 13. The auxiliary storage device 15 can include a magnetic disk device and/or an optical disk device, without being limited thereto.

The input device 14 is a device that takes in data from the outside. The input device 14 includes a touch screen, a button, a keyboard, a mouse, and/or a sensor, without being limited thereto. As described later, the sensor can include a sensor including one or more cameras and/or one or more microphones, without being limited thereto. Sensor data can be provided to a motion capture system for use in generating video.

The output device 16 can include a display device, a touch screen, and/or a printer device, without being limited thereto.

In such a hardware configuration, the central processing unit 11 can load, into the main storage device 12, instructions and data (computer programs) constituting a specific application stored in the auxiliary storage device 15, and perform operations with the loaded instructions and data. This allows the central processing unit 11 to control the output device 16 via the input/output interface device 13, or to transmit and receive various data to and from other devices (e.g., the server device 20 and another terminal device 10) via the input/output interface device 13 and the communication line 30.

This allows the terminal device 10 to execute at least one of various operations described below (various operations described in detail later) by executing computer-executable instructions for the installed specific application:
  Operation necessary for distributing the first video and/or the second video;
  Operation necessary for receiving token data and/or comment data transmitted from another terminal device 10 to the own terminal device 10;
  Operation necessary for receiving the first video and/or the second video distributed by another terminal device 10; or
  Operation necessary for transmitting token data and/or comment data to another terminal device 10, etc.

Additionally, the terminal device 10 can include one or more microprocessors and/or one or more graphics processing units (GPU) in place of or in addition to the central processing unit 11.

2-2. Hardware Configuration of Server Device 20

An example of the hardware configuration of each server device 20 is described with reference to FIG. 2 similarly. As the hardware configuration of each server device 20 (distribution server device 20a, DB server device 20b, game API server device 20c, and web server device 20B), the identical hardware configuration to that of each terminal device 10 described above can be used, for example. Therefore, reference numerals for the components of each server device 20 are shown in parentheses in FIG. 2.

As shown in FIG. 2, each server device 20 can mainly include a central processing unit 21, a main storage device 22, an input/output interface device 23, an input device 24, an auxiliary storage device 25, and an output device 26. These devices are interconnected via a data bus and/or a control bus.

The central processing unit 21, the main storage device 22, the input/output interface device 23, the input device 24, the auxiliary storage device 25, and the output device 26 may be substantially identical to the central processing unit 11, the main storage device 12, the input/output interface device 13, the input device 14, the auxiliary storage device 15, and the output device 16, respectively, included in each terminal device 10 described above.

In such a hardware configuration, the central processing unit 21 can sequentially load, into the main storage device 22, instructions and data (computer programs) constituting a specific application stored in the auxiliary storage device 25, and calculate the loaded instructions and data. This allows the central processing unit 21 to control the output device 26 via the input/output interface device 23, or to transmit and receive various data to and from other devices (e.g., each terminal device 10) via the input/output interface device 23 and the communication line 30.

This allows the server device 20 to execute an operation necessary for distributing, to the terminal device 10 of each viewer, the first video and/or the second video transmitted by the terminal device 10 of each distributor, an operation necessary for transmitting, to the terminal device 10 of a certain distributor, token data and/or comment data transmitted by the terminal device 10 of each viewer to the terminal device 10 of the distributor, and the like (including various operations described in detail later).

Additionally, the server device 20 can include one or more microprocessors and/or one or more graphics processing units (GPU) in place of or in addition to the central processing unit 21.

3. Functions of Each Device

Next, an example of functions of each of the terminal device 10 and the server device 20 will be described.

3-1. Functions of Terminal Device 10

Figure 3:
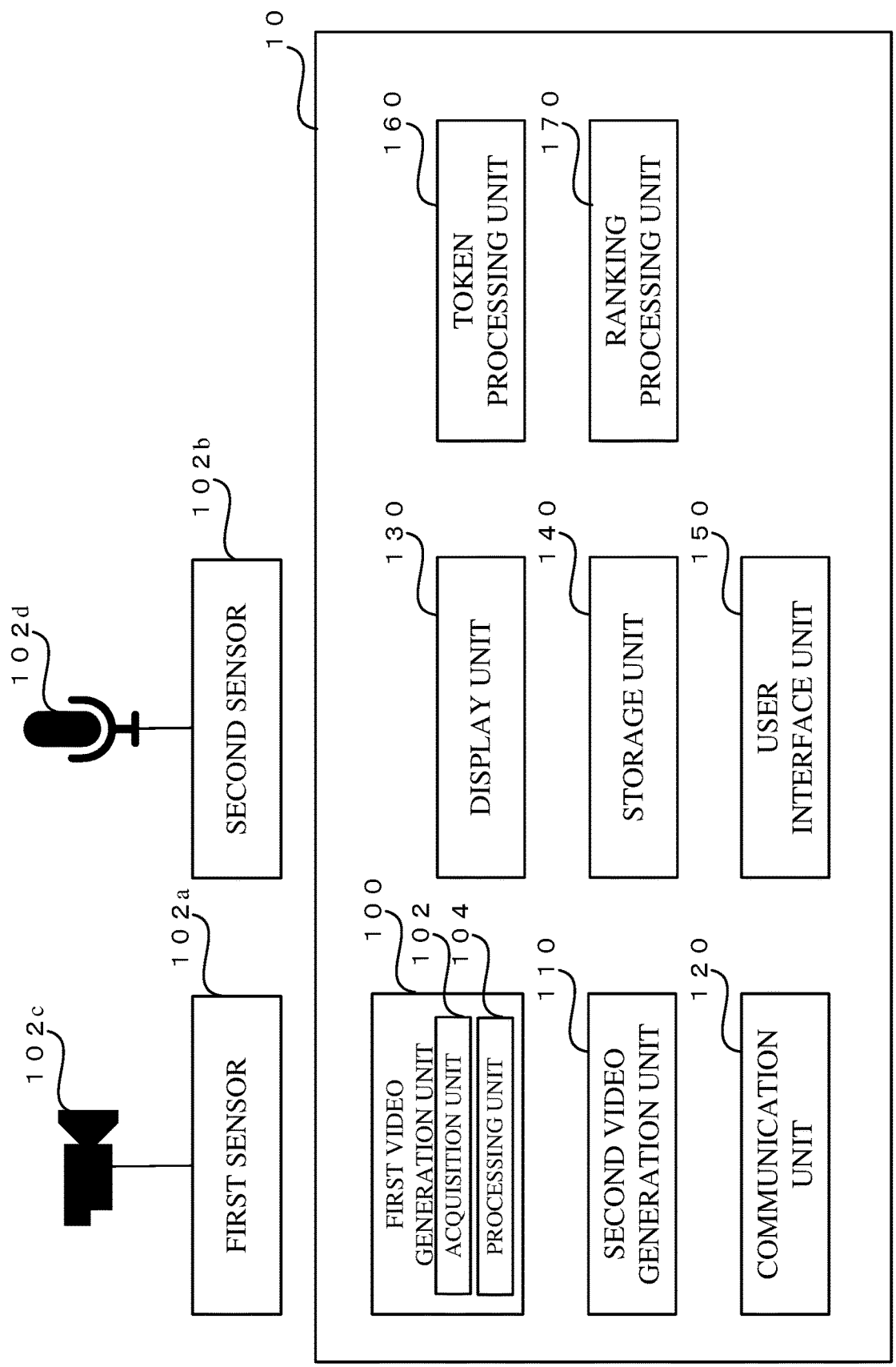
FIG. 3 is a block diagram schematically showing an example of a function of the terminal device shown in FIG. 1.

An example of the function of the terminal device 10 will be described with reference to FIG. 3. FIG. 3 is a block diagram schematically showing an example of a function of the terminal device 10 shown in FIG. 1.

As shown in FIG. 3, the terminal device 10 can mainly include a first video generation unit 100, a second video generation unit 110, a communication unit 120, a display unit 130, a storage unit 140, a user interface unit 150, a token processing unit 160, and a ranking processing unit 170.

(1) First Video Generation Unit 100

The first video generation unit 100 can generate the first video including an animation of a first avatar of a distributor on the basis of motion data related to the motion of the distributor. In order to realize this, the first video generation unit 100 can include an acquisition unit 102 and a processing unit 104, for example.

The acquisition unit 102 can include one or more first sensors 102a that acquire data related to the face of the distributor, and one or more second sensors 102b that acquire voice data related to speech and/or vocal given by the distributor.

In a preferred embodiment, the first sensor 102a can include an RGB camera 102c that captures visible light and a near infrared camera that captures near infrared rays. As such a camera, it is possible to use a camera included in a True Depth camera of iPhone X, for example. The second sensor 102b can include a microphone 102d to record voice and other audio.

First, regarding the first sensor 102a, the acquisition unit 102 captures an image of the face of the distributor using the first sensor 102a arranged close to the face of the distributor. This allows the acquisition unit 102 to generate data in which an image acquired by the RGB camera is recorded over a unit time in association with a time code (code indicative of the time of acquisition). The data described above can be an MPEG file, for example.

Furthermore, the acquisition unit 102 can generate data in which a predetermined number (e.g., 51) of numerical values (e.g., floating-point numerical values) indicative of the depth acquired by the near infrared camera are recorded over a unit time in association with the time code. The data described above can be, for example, a TSV file, which is a file in which a plurality of data are recorded by separating the data with tabs.

Regarding the near infrared camera, more specifically, a dot projector emits an infrared laser including a dot (point) pattern to the face of the performer, and the near infrared camera captures infrared dots projected and reflected on the face of the performer, thereby generating an image of the infrared dots captured in this manner. The acquisition unit 102 can compare an image of the dot pattern emitted by the dot projector registered in advance with an image captured by the near infrared camera. This allows the acquisition unit 102 to calculate the depth of each point (each feature point) by using positional deviation at each point (each feature point) in both images. Here, the points can include 51 points, for example. The depth of each point indicates the distance between each point and the near infrared camera. The acquisition unit 102 can generate data in which a numerical value indicative of the thus calculated depth is recorded over a unit time in association with the time code as described above.

Next, regarding the second sensor 102b, the acquisition unit 102 acquires the voice related to the speech and/or vocal given by the distributor using the second sensor 102b arranged close to the distributor. This allows the acquisition unit 102 to generate data recorded over a unit time in association with the time code. The data described above can be an MPEG file, for example. In an embodiment, the acquisition unit 102 can acquire data related to the face of the distributor using the first sensor 102a, and at the same time, acquire voice data related to speech and/or vocal given by the distributor using the second sensor 102b. In this case, the acquisition unit 102 can generate data (e.g., MPEG file) in which an image acquired by the RGB camera and voice data related to speech and/or vocal given by the distributor using the second sensor 102b are recorded over a unit time in association with an identical time code.

The acquisition unit 102 can output, to the processing unit 104, the thus generated data (MPEG file, TSV file, and the like) related to the face of the distributor and/or the voice data (MPEG file and the like) related to the speech and/or vocal given by the distributor.

Here, the case where the first sensor 102a includes an RGB camera and an infrared camera has been described. However, the first sensor 102a can include any of the following (A) to (C), for example.

(A) A camera that detects infrared rays emitted by an infrared laser and reflected on the face of the performer;
(B) A plurality of RGB cameras that capture visible light; or
(C) A single camera that captures visible light.

In the case of (A), the acquisition unit 102 can calculate the depth of each feature point on the face of the distributor by the same technique as that described above. In the case of (B), the acquisition unit 102 can calculate the depth of each feature point on the face of the distributor using a plurality of images captured by the plurality of RGB cameras. In the case of (C), the acquisition unit 102 can calculate, by using deep learning or the like, the depth of each feature point on the face of the distributor from the image captured by the single camera. Furthermore, in the case of (C), the acquisition unit 102 can calculate the depth of each feature point on the face of the performer by analysis processing (image processing and the like) for the image captured by the single camera.

On the basis of the data related to the face of the distributor from the acquisition unit 102, the processing unit 104 can generate a video including an animation of a virtual character (first avatar of the distributor). Regarding the video itself of a virtual character, the processing unit 104 can generate the video of the virtual character by causing a rendering unit (not shown) to execute rendering using various data stored in a character data storage unit (not shown). The various data described above can include, for example, geometry data, bone data, texture data, shader data, and blend shape data.

Furthermore, the processing unit 104 can generate, by using various well-known technologies, a video in which the facial expression of the first avatar is changed by using the data related to the face of the distributor from the acquisition unit 102 (data related to the depth of each feature point on the face of the performer). The video described above can be, for example, a video in which the facial expression of the first avatar is changed in synchronization with the movement of the mouth and both eyes of the performer, i.e., a video in which the facial expression of the first avatar is changed by lip sync and gaze tracking of the face of the performer.

Additionally, any other sutiable technology can be used in order to generate the first video including an animation of the first avatar of the distributor on the basis of motion data related to the action of the distributor. An example of such technology includes a technique referred to as "blend shapes" described in a website identified by the following URL.

https://developer.apple.com/documentation/arkit/arface-anchor/2928251-blendshapes When this technology is used, the processing unit 104 can adjust parameters of one or more feature points corresponding to the action of the distributor among a plurality of feature points on the upper body (face and so on) of the distributor. This allows the processing unit 104 to generate a video of a virtual character that follows the action of the distributor.

(2) Second Video Generation Unit 110

The second video generation unit 110 can generate the second video related to the computer-implemented game on the basis of operation data related to the operation of the distributor by using the web page received from the web server device 20B.

Specifically, the second video generation unit 110 can execute a game program incorporated in the web page received from the web server device 20B. This allows the second video generation unit 110 to draw the second video (game video) related to the game in which the game object (own game object) including the second avatar of the distributor acts, on the basis of the operation data indicative of the operation of the distributor having been input by the user interface unit 150. For example, the operation data can include one or more of the following: data indicative of how the distributor has swiped a touch pad display, data indicative of which object the distributer has tapped or clicked, or data indicative of how the distributor has dragged a touch pad display, or other such operation data. In the second video, for example, various game objects including an enemy character attacking the own game object and a wingman character supporting the own game object act according to the game program.

(3) Communication Unit 120

The communication unit 120 can communicate various data required for distribution and/or viewing of a video between the distribution server system 20A and the web server device 20B. For example, the communication unit 120 can access the web server device 20B and receive a web page (HTML document) including a game program required for execution of the game. When the terminal device 10 operates as the terminal device of the distributor, the communication unit 120 can transmit the first video and/or the second video to the distribution server system 20A, and receive, from the distribution server system 20A, token data and/or comment data transmitted to the distributor. Furthermore, when the terminal device 10 operates as the terminal device of the viewer, the communication unit 120 can receive, from the distribution server system 20A, the first video and/or the second video transmitted by the terminal device 10 of the distributor, and transmit token data and/or comment data for the distributor to the distribution server system 20A.

(4) Display Unit 130

The display unit 130 can display various images for distribution and/or viewing of the video. For example, the display unit 130 can display the first video and/or the second video to be distributed and/or the first video and/or the second video having been received.

(5) Storage Unit 140

The storage unit 140 can store various data used for distribution and/or viewing of the video.

(6) User Interface Unit 150

The user interface unit 150 can input various data required for distribution and/or viewing of the video through a user manipulation. For example, when the computer-implemented game is executed, the user interface unit 150 can input operation data indicative of the contents of the manipulation of the distributor from the distributor and output the operation data to the second video generation unit 110.

(7) Token Processing Unit 160

The token processing unit 160 can process token data transmitted and received in relation to distribution and/or viewing of the video. For example, when the terminal device 10 operates as the terminal device 10 of the distributor, the token processing unit 160 can process the token data transmitted to the distributor. When the terminal device 10 operates as the terminal device 10 of the viewer, the token processing unit 160 can process the token data transmitted by the viewer.

(8) Ranking Processing Unit 170

The ranking processing unit 170 can acquire (generate and/or receive) first ranking data indicative of the ranking related to each distributor who has received the token data and/or second ranking data indicative of the ranking related to each viewer who has transmitted the token data. Details of the first ranking data and the second ranking data will be described later in Section 6.

3-2. Functions of Server Device 20

Figure 4:
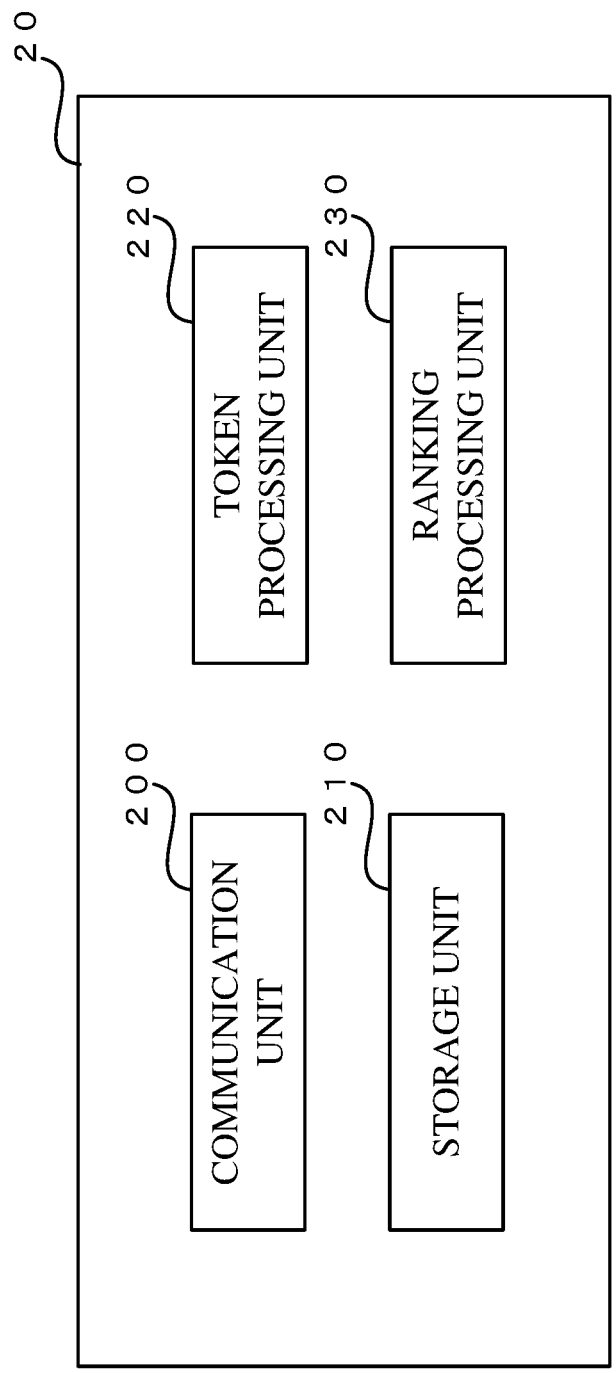
FIG. 4 is a block diagram schematically showing an example of a function of the server device shown in FIG. 1.

An example of the function of the server device 20 will be described with reference to FIG. 4. FIG. 4 is a block diagram schematically showing an example of a function of the server device 20 shown in FIG. 1.

As shown in FIG. 4, the server device 20 can mainly include a communication unit 200, a storage unit 210, a token processing unit 220, and a ranking processing unit 230.

The communication unit 200 can communicate various data used for distribution and/or viewing of a video between the terminal device 10 of the distributor and/or the terminal device 10 of the viewer. For example, when operating as the distribution server system 20A, the server device 20 can receive the first video and/or the second video from the terminal device 10 of each distributor and distribute the first video and/or the second video to the terminal device 10 of each viewer. When operating as the web server device 20B, the server device 20 can transmit, to the terminal device 10 of each distributor having accessed, a web page in which a computer-implemented game program is incorporated.

The storage unit 210 can store various data used for distribution and/or viewing of the video.

The token processing unit 220 can process the token data transmitted from each viewer to each distributor.

The ranking processing unit 230 can acquire (generate and/or receive) the first ranking data indicative of the ranking related to each distributor who has received the token data and/or the second ranking data indicative of the ranking related to each viewer who has transmitted the token data. Details of the first ranking data and the second ranking data will be described later in Section 6.

Additionally, when the server device 20 operates as the web server device 20B, the token processing unit 220 and the ranking processing unit 230 may be omitted.

4. Overall Operation of Video Distribution System 1

Figure 5A:
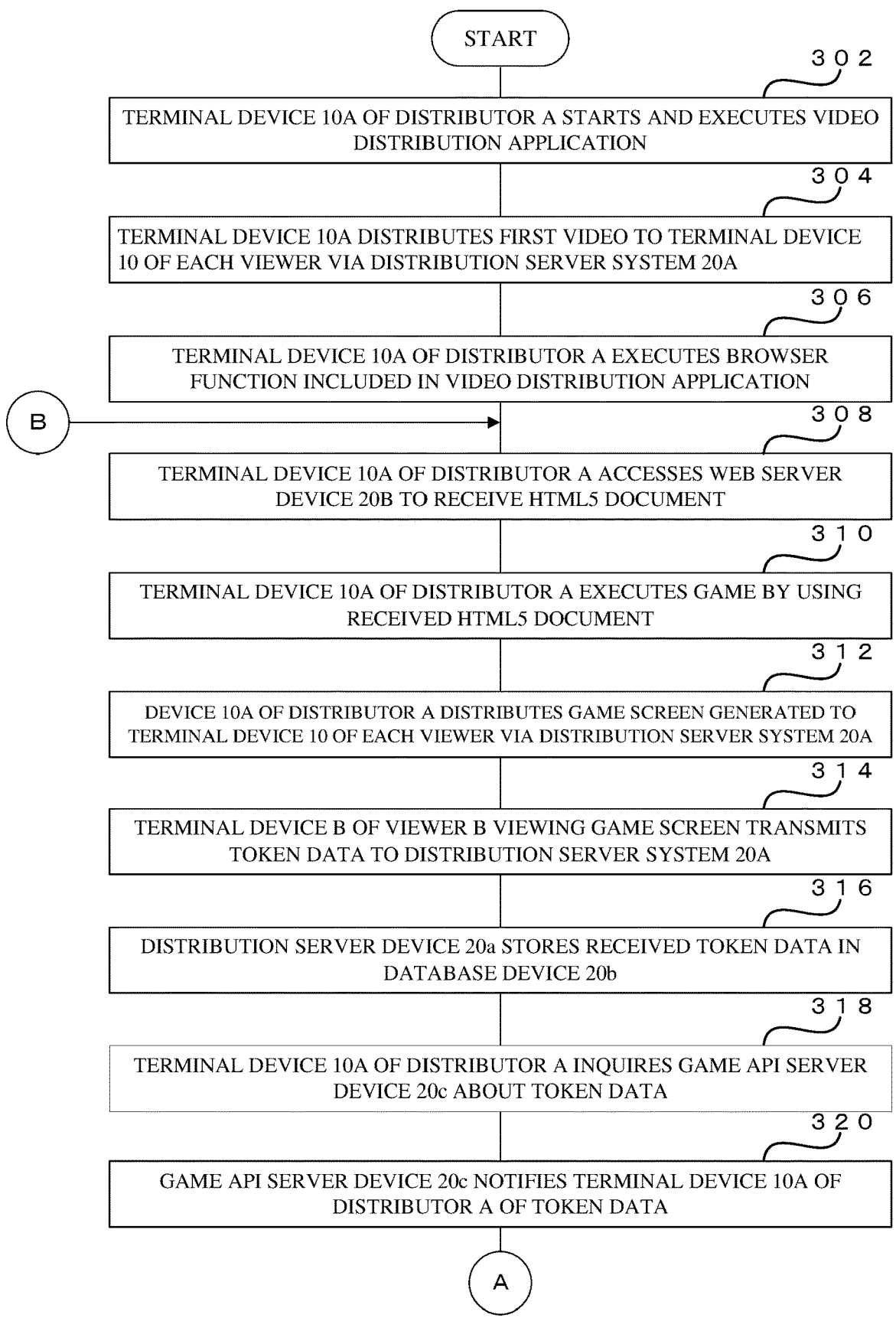
FIG. 5A is a flow diagram showing an example of an operation performed in the video distribution system shown in FIG. 1.
Figure 5B:
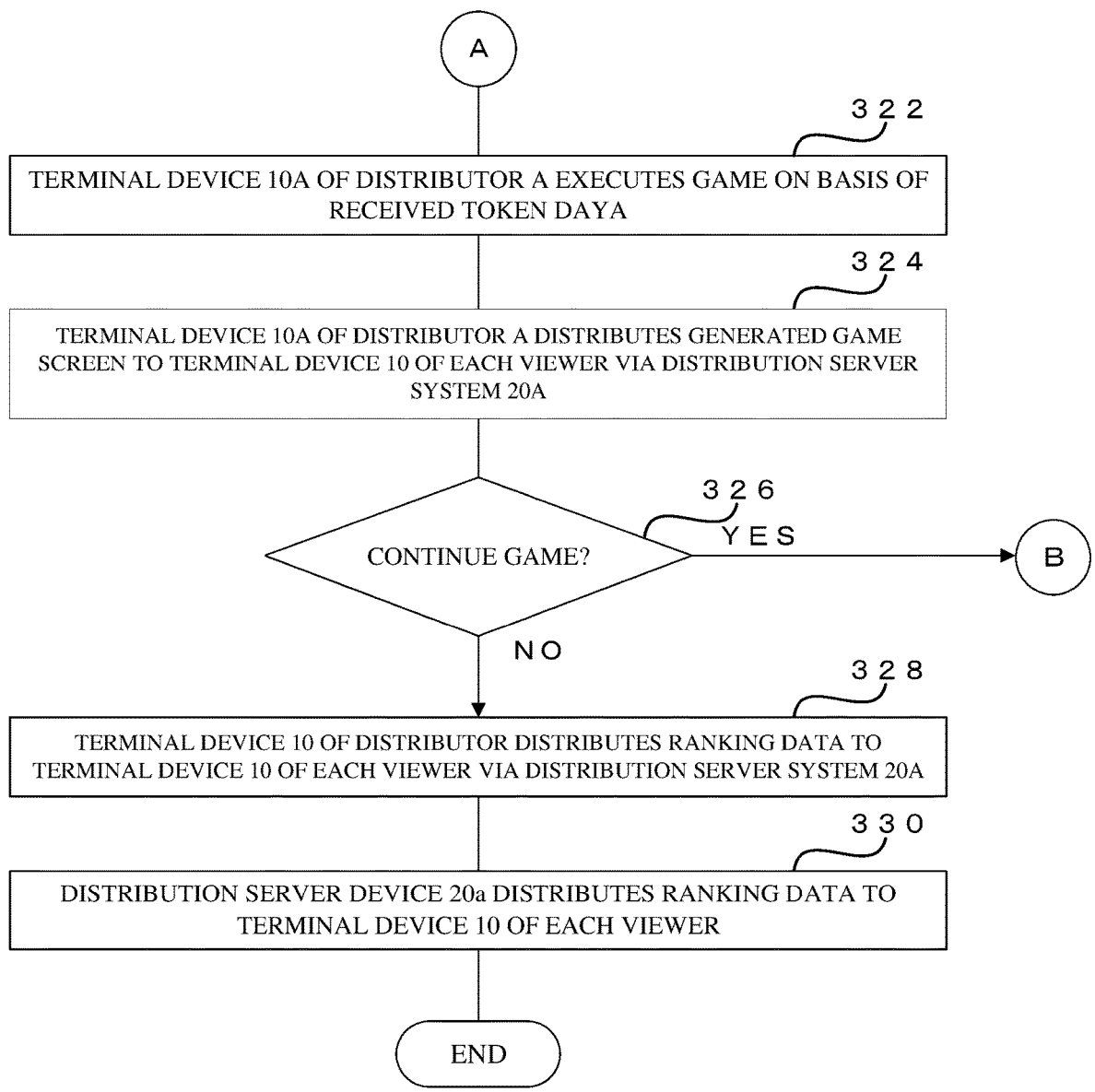
FIG. 5B is a flow diagram showing an example of an operation performed in the video distribution system shown in FIG. 1.

Next, the overall operation performed in the video distribution system 1 having the above configuration will be described with reference to FIGS. 5A and 5B. FIGS. 5A and 5B are flow diagrams showing an example of the operation performed in the video distribution system 1 shown in FIG. 1.

First, referring to FIG. 5A, in step (hereinafter referred to as "ST") 302, his/her terminal device 10 (here, terminal device 10A) starts and executes the video distribution application, following the operation of the distributor (here, distributor A).

Figure 6:
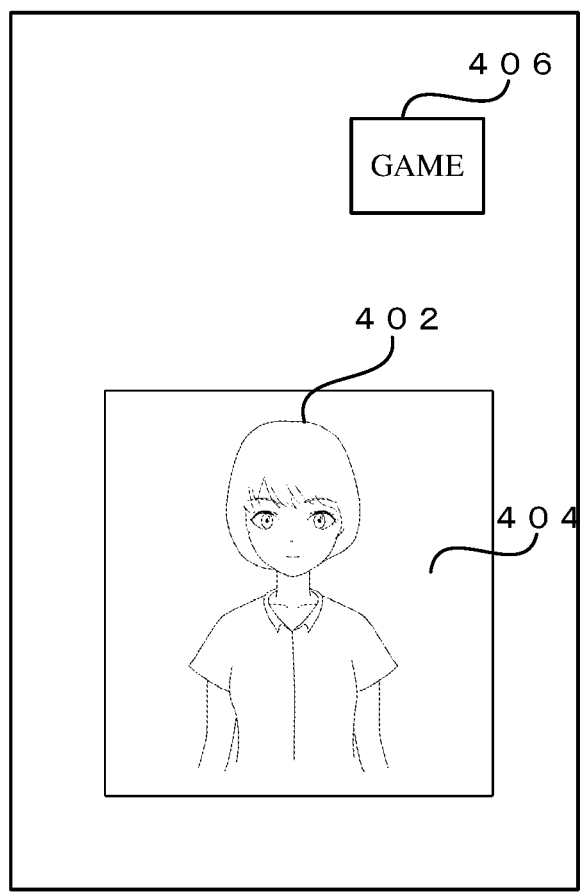
FIG. 6 is a schematic view showing an example of a first video displayed on a display unit of the terminal device shown in FIG. 1.

Next, in ST304, the terminal device 10A generates the first video including the animation of the first avatar of the distributor A on the basis of the motion data related to the motion of the distributor A. Due to this, as illustrated in FIG. 6, the display unit 130 of the terminal device 10A displays a first video 404 including the animation of a first avatar 402 of the distributor A.

Returning to FIG. 5A, the terminal device 10A transmits the generated first video 404 to the distribution server device 20a of the distribution server system 20A. The distribution server device 20a distributes the first video received from the terminal device 10A to the terminal device 10 of each viewer executing the video viewing application. Due to this, the display unit 130 of the terminal device 10 of each viewer also displays the first video 404 as illustrated in FIG. 6.

Next, in ST306, when the distributor A taps an icon 406 called "Game" (see FIG. 6) displayed on the display unit 130 of the terminal device 10A, the terminal device 10A executes a browser function implemented in the video distribution application. Due to this, in ST308, the terminal device 10A can receive an HTML5 document in which the game program is incorporated, by accessing the web server device 20B in a state where the video distribution application is executed (i.e., the first video 404 is distributed toward the terminal device 10 of each viewer).

Next, in ST310, the terminal device 10A can generate a video (second video) related to the game by executing the game program incorporated in the received HTML5 document.

Figure 7:
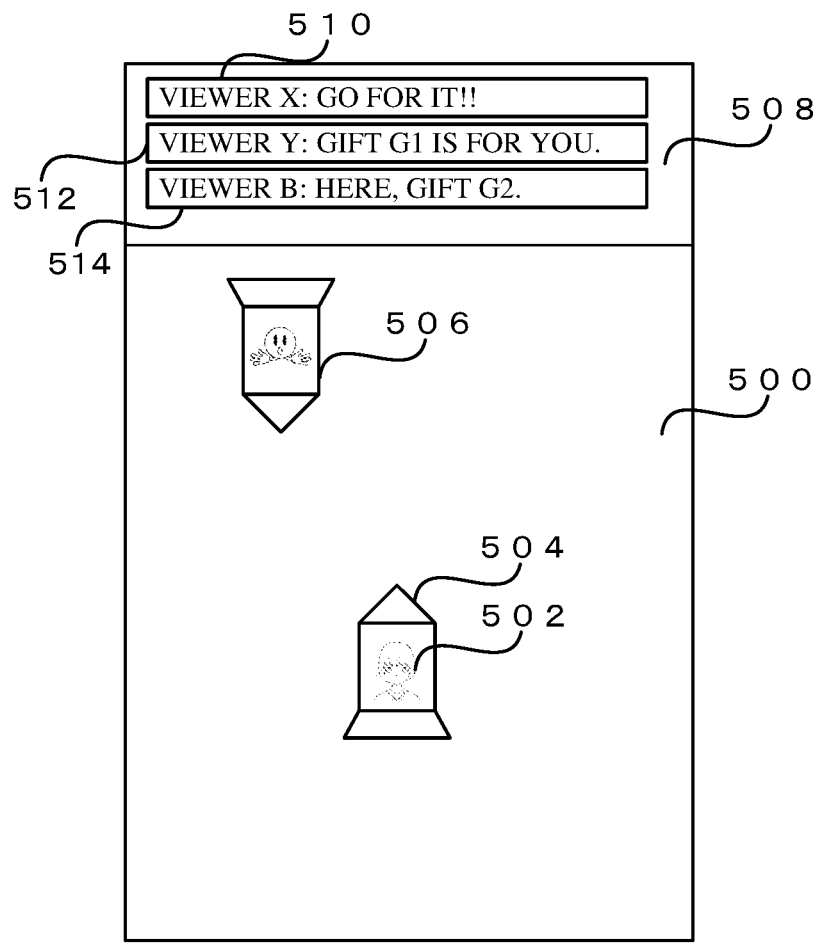
FIG. 7 is a schematic view showing an example of a second video displayed on the display unit of the terminal device shown in FIG. 1.

FIG. 7 is a schematic view showing an example of the second video displayed on the display unit of the terminal device 10A shown in FIG. 1. As illustrated in FIG. 7, in a second video 500, an own game object 504 including a second avatar 502 of the distributor A can act on the basis of operation data related to the operation performed for the user interface unit 150 of the distributor A. This allows the own game object 504, for example, to act according to the operation of the distributor A and attack a game object 506, which is an enemy character.

The second avatar 502 of the distributor A can be generated using the first avatar 402 of the first distributor A. For example, the second avatar 502 may be completely or substantially identical to the first avatar 402, may be a modification, reduction, and/or enlargement of at least a part of the first avatar 402, or may be a part of the first avatar 402.

In the second video 500, comment data transmitted from at least one viewer to the distributor A may be displayed on a part of area (chat area) (for example, in an upper area 508 as illustrated in FIG. 7). The comment data can include optional comment data such as a comment 510 indicating that a viewer X supports the distributor A and a comment 512 indicating that a viewer Y has given a token G1 to the distributor A.

Returning to FIG. 5A, in ST312, the terminal device 10A transmits the second video (game screen) 500 generated in ST310 to the distribution server device 20a of the distribution server system 20A (note that while the second video 500 is being transmitted to the distribution server device 20a of the distribution server system 20A, the terminal device 10A may stop transmitting the first video 404 or may transmit the first video 404). The distribution server device 20a distributes the second video received from the terminal device 10A to the terminal device 10 of each viewer executing the video viewing application (note that when receiving not only the second video 500 but also the first video 404 from the terminal device 10A, the distribution server device 20a may transmit only the second video 500 or both the second video 500 and the first video 404 to the terminal device 10 of each viewer). This also allows the display unit 130 of the terminal device 10 of each viewer to display the second video 500 as illustrated in FIG. 7 (for example, in a state of covering the first video as illustrated in FIG. 6 with most of the first video hidden).

Next, in ST314, a case where a viewer (viewer B) viewing the second video 500 transmitted by the terminal device 10A gives a token G2 to the distributor A will be considered. The viewer B can operate his/her terminal device 10B to select a token B from a plurality of prepared tokens and select a command to be given to the distributor A. Thus, the terminal device 10B transmits, to the distribution server device 20a of the distribution server system 20A, token data indicative of providing the token G2 to the distributor A. The token data can include, for example, receiver identification data to identify a receiver of the token (distributor A), token identification data to identify the token, and transmitter identification data to identify a transmitter of the token (viewer B).

When providing a token by operating his/her terminal device 10B, the viewer B can also transmit a comment together with the token. In this case, the token data transmitted by the terminal device 10B to the distribution server device 20a can include comment data in addition to the receiver identification data, the token identification data, and the transmitter identification data.

In ST316, the distribution server device 20a can store the token data received from the terminal device 10B in the DB server device 20b. For example, the DB server device 20b can store, as token data, piece count identification data, which is to identify as to what number the token was given, the token identification data, and the transmitter identification data (moreover, comment data), in association with the receiver identification data.

In ST318, the terminal device 10A of the distributor A can make an inquiry to the game API server device 20c whether new token data has arrived to the distributor A at each predetermined time interval while the game is being executed. For example, when having received one piece of token data (e.g., token data from the viewer Y illustrated in FIG. 7) from the game API server device 20c since the start of playing the game, the terminal device 10A can make an inquiry to the game API server device 20c as to whether or not the second and subsequent pieces of token data are present.

In ST320, in response to an inquiry from the terminal device 10A, the game API server device 20c requests the DB server device 20b for the second and subsequent pieces of token data about the distributor A. When having successfully retrieved the second and subsequent pieces of piece count identification data as the piece count identification data stored in association with the distributor A (receiver identification data), the DB server device 20b transmits the token identification data and the transmitter identification data (moreover, the comment data) corresponding to each of the second and subsequent pieces of piece count identification data to the game API server device 20c as the second piece of token data. Here, on the assumption of having successfully retrieved only the second piece of the piece count identification data, the DB server device 20b transmits the token identification data and the transmitter identification data (moreover, the comment data) corresponding to the second piece of piece count identification data to the game API server device 20c as the second piece of token data. In response to this, the game API server device 20c transmits the second piece of token data to the terminal device 10A of the distributor A.

Next, referring to FIG. 5B, in ST322, the terminal device 10A having received the second piece of token data can execute the game on the basis of the second piece of token data. The terminal device 10A can display, on the game screen (second video), a game object having been set on the basis of the transmitter (here, viewer B) identified by the transmitter identification data included in the token data and/or a token (here, token G2) uniquely identified by the token identification data included in the token data. For example, the terminal device 10A can display, on the second video, a game object (enemy character and/or friend character) including the avatar of the viewer B, or can display, on the second video, an own game object (game object including the second avatar of the distributor A) whose hit point has increased on the basis of the token G2. Each terminal device 10 can store the avatar (image) of the user (viewer) in association with each piece of transmitter identification data, and can store the token (image) or the like in association with each piece of token identification data. This allows each terminal device 10 to generate and display the second video including the avatar of each viewer and/or each token. A specific technique of generating the second video on the basis of the token data will be described later in Section 5.

The terminal device 10A can also display the comment data included in the token data on the game screen (second video). For example, as illustrated in FIG. 7, when the viewer B selects in ST314 transmitting a comment when providing the token G2 to the distributor A, the terminal device 10A can display the comment data of "Here, token G2." on the second video. In this way, the viewer's comment displayed on the second video can correspond to the token data transmitted from the viewer to the distributor.

The terminal device 10A has received two pieces of token data from the game API server device 20c so far (the terminal device 10A identifies how many pieces of token data have been received so far during the execution of the game), and hence the terminal device 10A can make an inquiry to the game API server device 20c as to whether or not the third and subsequent pieces of token data are present in the next time interval.

Next, returning to FIG. 5B, the terminal device 10A distributes in ST324 the second video including the game object having been set on the basis of the token data in this manner to the terminal device 10 of each viewer via the distribution server system 20A in the same technique as in ST312.

Next, in ST326, in the case of continuing the game, the terminal device 10A can repeat the processing in and after ST308 described above. On the other hand, when the terminal device 10A ends the game, the process proceeds to ST328.

In ST328, the terminal device 10A can distribute the ranking data to the terminal device 10 of each viewer via the distribution server device 20a of the distribution server system 20. In ST330, instead of ST328 or after ST328, the distribution server device 20a can distribute the ranking data to the terminal device 10 of each viewer. At least one of ST328 and ST330 may be executed, or both ST328 and ST330 may be omitted. Details of the ranking data will be described later in Section 6.

5. Generation of Second Video (Game Screen) Based on Token Data

Next, a specific technique for generating the second video on the basis of the token data mentioned in relation to ST322 will be described.

5-1. Generation of Game Object that Attacks or Supports Own Game Object (Part 1)

Figure 8:
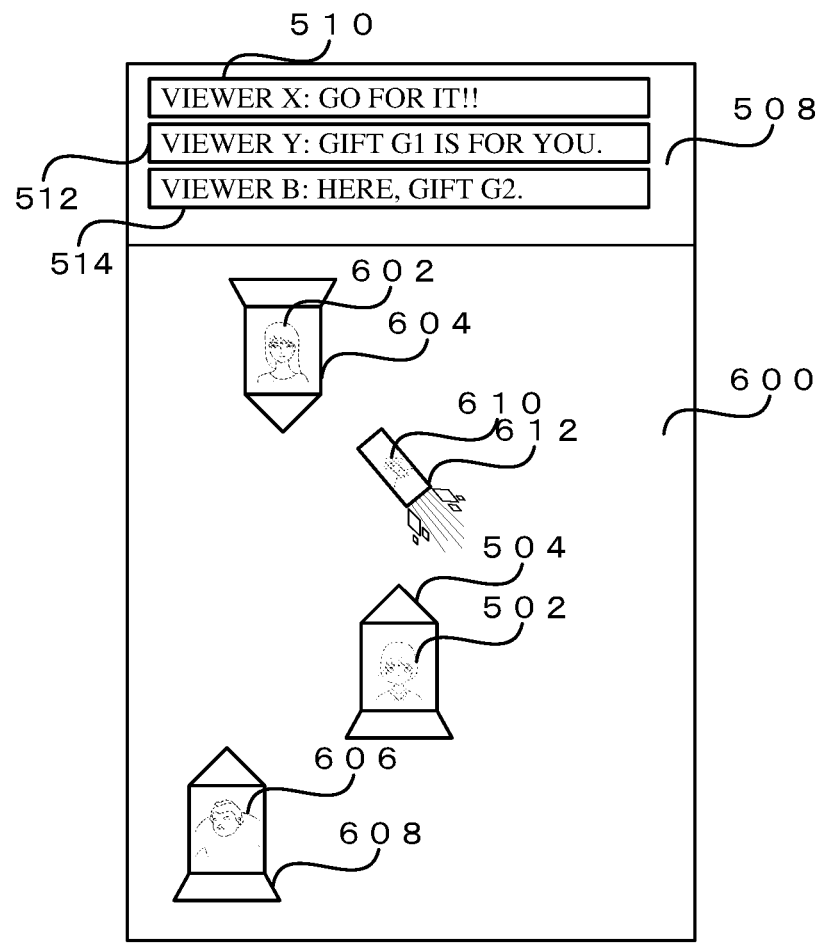
FIG. 8 is a schematic view showing another example of the second video displayed on the display unit of the terminal device shown in FIG. 1.

FIG. 8 is a schematic view showing another example of the second video displayed on the display unit of the terminal device 10A shown in FIG. 1. In a second video 600 shown in FIG. 8, the own game object 504 including the second avatar 502 of the distributor A is displayed, which is similar to the example shown in FIG. 7.

First, a viewer (here, viewer C) viewing the second video 600 distributed by the terminal device 10A of the distributor A can use his/her terminal device 10 (here, terminal device 10C) to transmit token data to the distributor A. In this case, the terminal device 10A receives the token data transmitted by the terminal device 10C from the game API server device 20c by the technique described above in relation to ST318 and ST320. In response to this, the terminal device 10A can generate a game object 604 including an avatar 602 of the viewer C as a game object set on the basis of the received token data and display it on the second video 600. This game object 604 can be set as an enemy character that attacks the own game object 504. The enemy character can be, for example, a frequently-appearing common small-fry character, or can be a so-called boss character appearing at the end of a scene, a level, a scenario, or a stage.

Next, another viewer (here, viewer D) viewing the second video 600 can use his/her terminal device 10 (here, terminal device 10D) to transmit the token data to the distributor A. In this case, the terminal device 10A receives the token data transmitted by the terminal device 10D from the game API server device 20c by the technique described above in relation to ST318 and ST320. In response to this, the terminal device 10A can generate a game object 608 including an avatar 606 of the viewer D as a game object set on the basis of the received token data and display it on the second video 600. This game object 608 can be set as a friend character (wingman) that supports the own game object 504 and attacks the game object 604.

Furthermore, another viewer (here, viewer 10E) viewing the second video 600 can use his/her terminal device 10 (here, terminal device 10E) to transmit the token data to the distributor A. In this case, the terminal device 10A receives the token data transmitted by the terminal device 10E from the game API server device 20c by the technique described above in relation to ST318 and ST320. In response to this, the terminal device 10A can generate a game object 612 including an avatar 610 of the viewer E as a game object set on the basis of the received token data and display it on the second video 600. This game object 612 can be set as a friend character that supports the own game object 504 and attacks the game object 604. The friend character can be, for example, a missile that flies towards the game object 604 and reduces the physical power of the game object 604.

The second video 600 (game screen) generated by the terminal device 10A in this manner is distributed to the terminal device 10 of each viewer via the distribution server device 20c, as described in relation to ST324. This allows the second video 600 illustrated in FIG. 9 to be displayed similarly in the terminal device 10 of each viewer.

The action of the game objects 604, 608, and 612 set on the basis of the token data in this manner can be automatically controlled by the game program executed by the terminal device 10A in an embodiment.

At least one parameter that each of the game objects 604, 608, and 612 has can be set on the basis of the token data. This parameter can include the offensive power, the defensive power, the physical power, the mobile power, the equipment, and/or items of the corresponding game object.

Furthermore, the parameter can be set on the basis of the token data. Specifically, for example, in a phase of providing a token to the distributor A by using his/her terminal device 10C, the viewer C can select a desired token from among a plurality of prepared tokens. A token point corresponding to each of the plurality of tokens is set and displayed on the token. In an embodiment, the token point corresponding to a token can be the purchase price of the token. In another embodiment, each viewer can obtain a point (also referred to as a "my point") each time he/she views the second video (may be the first video) distributed by the distributor. Each viewer can select a desired free token from among a plurality of prepared free tokens, and acquire the desired free token by consuming My Point held by the viewer. Therefore, in this case, the token point corresponding to a token can be the number of My Point consumed in acquiring the token.

The terminal device 10A of the distributor A having received the token data from the viewer C can read, from the storage unit 140, the token point corresponding to the token identification data included in the token data, and set the parameter described above of the game object 604 on the basis of the read token point (so as to be proportional to the token points, for example).

In this manner, when each viewer viewing the second video 600 transmits the token data to the distributor, the game object including the avatar of the viewer is displayed as a game object that can affect the own game object (game object including the avatar of the distributor) in the second video 600 viewed by the distributor and each viewer. This allows each viewer to affect the success or failure of the game played by the distributor by transmitting the token data to the distributor, and hence the viewer can have a sense of being involved in the game. Furthermore, each viewer can select a token with a higher token point (price, for example) as a token to give to the distributor. Due to this, the game object set on the basis of the height of the token point affects (have a greater impact on the success or failure of the game) the own game object. This allows each viewer to have a sense of being involved in the game more strongly.

Furthermore, in general, in a case where a game program is installed in the terminal device 10 or in a case where a game program is incorporated in a video distribution application installed in the terminal device 10, it is necessary to install a new game program or a video distribution application incorporating the new game program in the terminal device 10 in order to execute the new game. In this case, from the point of view of the creator of the game program, it is necessary to prepare a game program corresponding to each of a plurality of operating systems, and thus there is a problem of an increase in the man-hour required for the creation of the game program. On the other hand, from the point of view of the user, it is necessary to download a new game program and/or to update an existing game program in order to obtain a new game, and thus there is a problem of requiring communication load, communication cost, time, and labor.

On the other hand, according to the technology disclosed in the present application, in order to execute the game, the terminal device 10 of the distributor can call the browser function incorporated in the video distribution application, instead of executing the game program installed in the terminal device 10. Furthermore, the terminal device 10 receives a web page (HTML document, particularly HTML5 document) from the web server device 20B by using this browser function, and executes the game program incorporated in the web page. This allows the terminal device 10 of the distributor to easily execute the new game. Therefore, when providing a new game, the creator of the game program only has to incorporate the new game program into the web page (HTML document, particularly HTML5 document) transmitted by the web server device 20B. This can reduce the number of man-hours required for creation of the new game program. Furthermore, since the user does not need to download a new game program or the like in order to be provided with the new game, it is possible to suppress communication load, communication cost, time, and labor.

Figure 9:
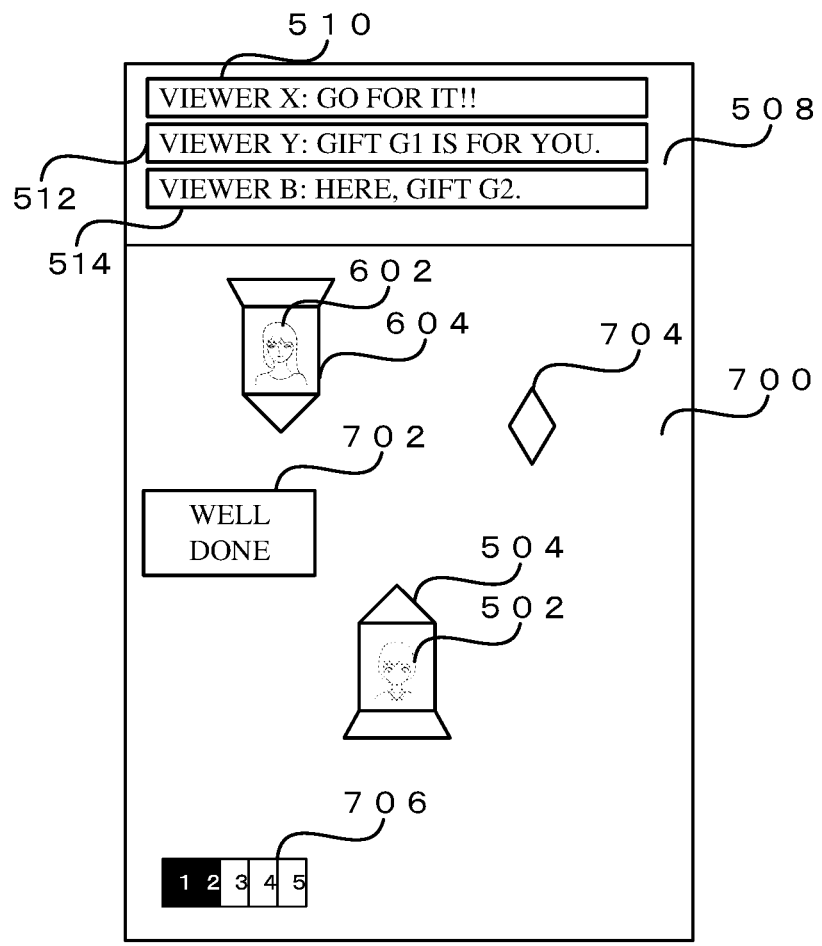
FIG. 9 is a schematic view showing still another example of the second video displayed on the display unit of the terminal device shown in FIG. 1.

5-2. Generation of Game Object that Changes Parameters Related to Own Game Object FIG. 9 is a schematic view showing still another example of the second video displayed on the display unit of the terminal device 10A shown in FIG. 1. In a second video 700 shown in FIG. 9, the own game object 504 including the second avatar 502 of the distributor A is displayed, which is similar to the example shown in FIG. 7.

First, a viewer (here, viewer C) viewing the second video 700 distributed by the terminal device 10A of the distributor A can use his/her terminal device 10 (here, terminal device 10C) to transmit token data to the distributor A. In this case, the terminal device 10A receives the token data transmitted by the terminal device 10C from the game API server device 20c by the technique described above in relation to ST318 and ST320. In response to this, the terminal device 10A can generate a game object which gives a point (ranking point) based on the token data to the distributor A by interacting with the own game object 504, and/or a game object which gives a parameter based on the token data to the own game object 504 by interacting with the own game object 504, as a game object set on the basis of the received token data, and display it on the second video 700.

Specifically, in the first example, the distributor A operates the own game object 504 to cause the own game object 504 to interact with a game object 702 indicating text such as "Well done" (for example, to come into contact with the game object 702, or to come into contact with a missile fired against the game object 702), whereby the distributor A can acquire a ranking point set on the basis of the token data corresponding to the own game object 702. In this case, the terminal device 10A can read, from the storage unit 140, the ranking point corresponding to the token identification data included in the received token data, and can give the read ranking point (or a ranking point obtained by further increasing or decreasing this ranking point) to the distributor A.

In the second example, by manipulating the own game object 504, the distributor A can cause the own game object 504 to interact with a game object 704 having a diamond shape, for example (for example, to come into contact with the game object 704, or to come into contact with a missile fired against the game object 704). This allows the own game object 504 to have a parameter set on the basis of token data corresponding to the game object 704. In this case, the terminal device 10A can read the token point corresponding to the token identification data from the storage unit 140, and set at least one parameter of the own game object 504 on the basis of the read token point (so as to be proportional to the token points, for example). This parameter can include the offensive power, the defensive power, the physical power, the mobile power, the equipment, and/or items of the own game object 504. Thus, by manipulating the own game object 504 to cause it to interact with the game object 704, the distributor A can increase (or decrease) parameters such as the offensive power, the defensive power, the physical power, and/or the mobile power of the own game object 504 and can give new equipment (weapon and/or guard) and/or items to the own game object 504 (or eliminate the equipment and/or items held by the own game object 504).

In the first example, instead of the configuration in which the distributor A acquires the ranking point by the own game object 504 interacting with the game object 702 once, it is possible to adopt a configuration in which the distributor A acquires the ranking point only after the own game object 504 interacts with the game object 702 a predetermined number of times (threshold value). Similarly, also in the second example, instead of the configuration in which the parameter of the own game object 504 is changed by the own game object 504 interacting with the game object 704 once, it is possible to adopt a configuration in which the parameter of the own game object 504 is changed only after the own game object 504 interacts with the game object 704 a predetermined number of times (threshold value).

For example, focusing on the second example, each time the terminal device 10A interacts with the game object 704 displayed on the second video on the basis of the token data received from the terminal device 10 of any of the plurality of viewers, a count value can be incremented by one. Only after the count value exceeds the threshold value, parameters such as the offensive power, the defensive power, the physical power, and/or the mobile power of the own game object 504 can be changed (increased or decreased), and/or the equipment and/or items can be given (or eliminated). In this case, each time the terminal device 10A interacts with the game object 704 displayed on the second video on the basis of the token data received from the terminal device 10 of any of the viewers, the terminal device 10A can turn on the count value (here, count value of 1 to 5) indicated on a gauge 706 one by one, and when the count value exceeds the threshold value (here, 4) (when the count value becomes 5), the terminal device 10A can change the parameter of the own game object 504.

Thus, the technique of changing the parameter of the own game object 504 when the count value exceeds the threshold value while displaying the count value and the threshold value (display of the numerals of 1 to 5 indicates that the threshold value is 4) based on the received token data on the second video 700 can be applied similarly to the first example described above, in which the ranking point based on the received token data is given to the distributor A when the count value based on the received token data exceeds the threshold value.

The second video 700 (game screen) generated by the terminal device 10A in this manner is distributed to the terminal device of each viewer via the distribution server device 20c, as described in relation to ST324. This allows the second video 700 illustrated in FIG. 9 to be displayed similarly in the terminal device of each viewer.

Additionally, the game objects 702, 704, and the like displayed on the second video can be generated by any text, symbols, images, and/or combination thereof. The game objects 702, 704, and the like displayed on the second video can include the avatar of the viewer who transmitted the corresponding token. Furthermore, the game objects 702, 704, and the like can be stationary objects or moving objects on the second video.

In a case where a ranking point is given to the distributor on the basis of the token data received from any of the viewers and/or in a case where a parameter of the own game object is changed on the basis of the token data received from any of the viewers, the value of the ranking point and/or the value of the parameter can be changed on the basis of the progress of the game distributed by the distributor at the time point when the token data is generated or transmitted by the terminal device 10 of the viewer (or can be at the time point when the token data is received by the terminal device 10 of the distributor). For example, the value of the ranking point and/or the value of the parameter can be made smaller as the game distributed at the time of generation or transmission of the token data is at a time point closer to the beginning, and can be made larger as the game distributed at the time of generation or transmission of the token data is at a time point closer to the end. Thus, the better the distributor plays the game (in other words, the longer the distributor can play the game without failing), the larger the ranking point and/or the parameter to be given to the own game object the distributor can acquire, and the larger the number of viewers who view this game and transmit the token is (in other words, the larger the total number of fans of the distributor is), the larger the ranking point and/or the parameter to be given to the own game object the distributor can acquire. This allows the distributor and each viewer to find a greater enjoyment with this game.

Thus, when transmitting the token data to the distributor, each viewer viewing the second video 700 can change the parameter of the own game object or give a ranking point to the distributor on the basis of the token data. This allows each viewer to affect the success or failure of the game played by the distributor and/or support the distributor by transmitting the token data to the distributor, and hence the viewer can have a sense of being involved in the game. Furthermore, by transmitting the token data to the distributor, each viewer can immediately change the count value displayed on the second video, and hence the viewer (in particular, a viewer generating a count value exceeding the threshold value, in the example shown in FIG. 9, the viewer having generated the count value of 5, which exceeds the threshold value of 4) can have a stronger sense of being involved in the game.

5-3. Display of Plurality of Game Objects

When a plurality of viewers transmit token data to give the identical game object 702 (or game object 704) as illustrated in FIG. 7 to the distributor A, the number of game objects 702 (704) corresponding to the total number of those viewers are displayed on the second video 700, normally. In the case where the total number of the plurality of viewers transmitting the token data is thus large, a large number of the game objects 702 (704) are simultaneously displayed on the second video 700, whereby there is a possibility that the progress of the game is hindered.

Then, in the case of receiving the token data from a plurality of viewers regarding the identical game object 702 (704), the terminal device 10A of the distributor A can integrate the plurality of those identical game objects in various aspects in accordance with the total number of the plurality of those identical game objects for display on the second video.

Figure 10:
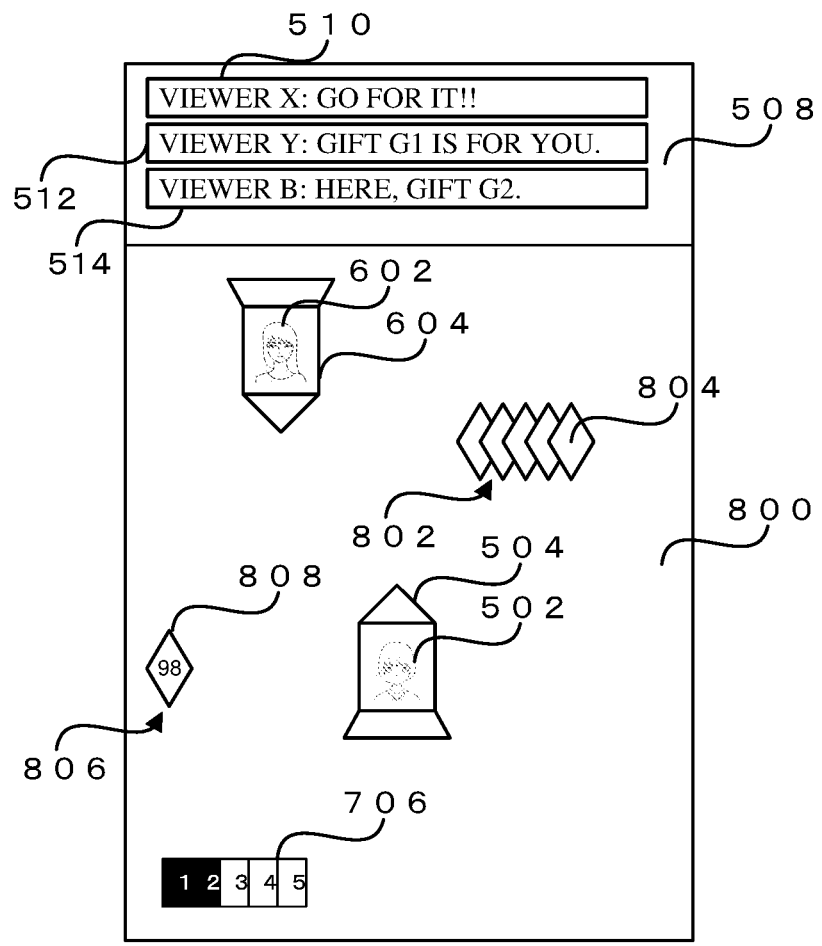
FIG. 10 is a schematic view showing yet another example of the second video displayed on the display unit of the terminal device shown in FIG. 1.

FIG. 10 is a schematic view showing yet another example of the second video displayed on the display unit of the terminal device 10A shown in FIG. 1. Here, the total number of a plurality of identical game objects is referred to as the "total number of objects" for convenience.

First, as a first aspect, it is possible to use an aspect in which as many a certain representative game object as the "total number of objects" overlaps. As illustrated in FIG. 10, for example, when a target game object 802 can have a diamond shape and five of this identical game objects 802 are displayed (the total number of objects is 5), the five identical game objects 802 are displayed in an aspect in which as many a certain representative object 804 as the total number of objects (here, 5) overlaps. While here, as an example, the representative object 804 is identical to each of the game objects 802, the representative object 804 can be an object in which the game object 802 is deformed (enlarged, reduced, rotated, inverted, excerpted, or the like), or can be an object in which the game object 802 is expressed by text and/or a symbol.

As a second aspect, it is possible to use an aspect in which the game object is expressed by a combination of a certain representative game object and a text indicating the total number of objects. As illustrated in FIG. 10, for example, when a target game object 806 can have a diamond shape and 98 of this identical game objects 806 are displayed (the total number of objects is 98), the 98 identical game objects 806 are expressed by a combination of a certain representative object 808 and text ("98", "x98", or the like) indicating the total number (here, 98) of objects. While here, as an example, the representative object 808 is identical to each of the game objects 806, the representative object 808 can be an object in which the game object 806 is deformed (enlarged, reduced, rotated, inverted, excerpted, or the like), or can be an object in which the game object 806 is expressed by text and/or a symbol.

As a third aspect, it is possible to use an aspect in which a certain representative game object is expressed by a density corresponding to the total number of objects. For example, the density of the color given to the representative game object can be set to be high (or low) in proportion to the total number of objects. While also in this aspect, the representative object described above can be identical to the target game object, the representative object can be an object in which the target game object is deformed (enlarged, reduced, rotated, inverted, excerpted, or the like), or can be an object in which the target game object is expressed by text and/or a symbol.

As a fourth aspect, it is possible to use an aspect in which a certain representative game object is expressed by a size corresponding to the total number of objects. For example, the size of the representative game object can be set to be large in proportion (or to be small in inverse proportion) to the total number of objects. While also in this aspect, the representative object described above can be identical to the target game object, the representative object can be an object in which the target game object is deformed (enlarged, reduced, rotated, inverted, excerpted, or the like).

The first aspect to the fourth aspect described above are applicable in the case of displaying a plurality of identical game objects in the second video, and the identical game objects can include each of the game objects 604, 608, and 612 illustrated in FIG. 8 and the game objects 702 and 704 illustrated in FIG. 9, without being limited thereto. Furthermore, the first aspect to the fourth aspect described above can be used in combination with one another.

In this manner, when each viewer viewing the second video transmits the token data to the distributor, the game object including the avatar of the viewer is displayed as a game object that can affect the own game object in the second video viewed by the distributor and each viewer. This allows each viewer to affect the success or failure of the game played by the distributor by transmitting the token data to the distributor, and hence the viewer can have a sense of being involved in the game. Furthermore, when transmitting the token data to the distributor, each viewer viewing the second video can change the parameter of the own game object or give a ranking point to the distributor on the basis of the token data. This allows each viewer to affect the success or failure of the game played by the distributor and/or support the distributor by transmitting the token data to the distributor, and hence the viewer can have a sense of being involved in the game.

Furthermore, in the case where a plurality of viewers transmit an identical token to the distributor, the terminal device 10 of the distributor can integrate the plurality of identical game objects in various aspects in accordance with the total number of those game objects for display on the second video. This allows the terminal device 10 to at least partially suppress the situation in which the progress of the game being distributed is hindered while surely showing, on the second video, the fact that the plurality of identical tokens have been given to the distributor (i.e., the fact that each viewer has given a token to the distributor).

By displaying the plurality of game objects in the aspect in accordance with the total number of those game objects, it is possible to suppress the size occupied by the plurality of those objects in the display unit and the calculation amount necessary for drawing and processing of the plurality of those objects. In general, the resolution (screen size) of the display unit of the terminal device 10 of the user and the computing capability of the terminal device 10 of the user are limited, and are further limited in the order of a personal computer, a smartphone, and a feature phone. Hence, displaying a plurality of game objects in the aspect in accordance with the total number of those game objects is particularly important in the terminal device 10 having such limited resolution and computing capability.

5-4. Generation of Game Object that Attacks or Supports Own Game Object (Part 2)

Figure 11:
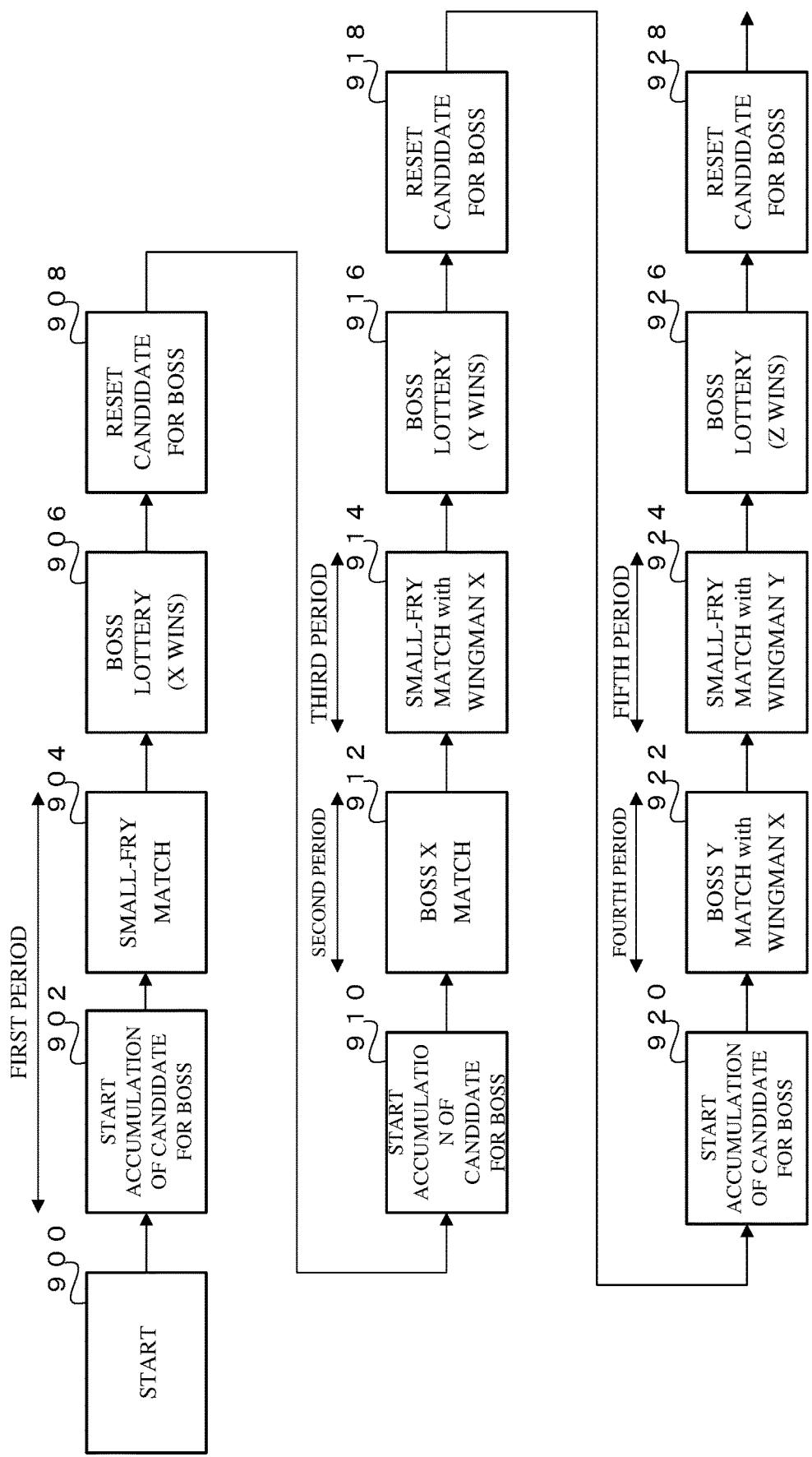
FIG. 11 is a flow diagram showing a method of selecting an avatar of a viewer displayed in a computer-implemented game executed on the terminal device shown in FIG. 1.

FIG. 11 is a flow diagram showing a method of selecting an avatar of a viewer displayed in a game executed on the terminal device 10 shown in FIG. 1.

First, in ST900, in line with the technique described with reference to FIGS. 5A and 5B, a game is started by the terminal device 10A of the distributor A, and a video (second video) related to the game is distributed to the terminal device 10 of each viewer via the distribution server device 20a by the terminal device 10A. Here, as an example, a shooter game as illustrated in FIGS. 7 to 10 is executed and distributed.

Next, in ST902, in order to determine an avatar of a viewer to appear as a boss character (or part of the boss character) in ST912 described later, the terminal device 10A starts to accumulate data related to a plurality of candidate viewers. Specifically, the terminal device 10A generates a list of viewers who have transmitted the token data to the distributor A on the basis of the token data received from the game API server device 20c for each predetermined time interval. The generation of this list can be continued until processing in ST906 is started.

Next, in ST904, the terminal device 10A executes a match (small-fry match) between the own game object 504 (See FIG. 7 and the like) and a small-fry character (trivial character having a relatively weak offensive power and physical power, as well as a simple behavioral pattern) during the game. Also, during ST904, the list of viewers mentioned in ST902 is continuously generated.

Next, in ST906, the terminal device 10A selects one viewer at random from among the list of viewers generated so far. In another embodiment, the terminal device 10A can select from among the list of viewers on a priority basis one viewer who has done predetermined activities most frequently with respect to the first and/or second video distributed by the distributor A. The predetermined activities can include one or more of the following: sending token data (gift data) to the distributor A, sending comment data to the distributor A, or sending "nice!" data to the distributor A, or sending other such data to the distributor A. Also, in another embodiment, the terminal device 10A can select from among the list of viewers on a priority basis one viewer who has most frequently viewed the first and/or second video distributed by the distributor A. Further, in another embodiment, the terminal device 10A can select from among the list of viewers one viewer who has (i) the most (or fewest) total times the one viewer sent token data and/or comment data to any distributors, (ii) the most (or fewest) total times the one viewer received token data and/or comment data from any viewers, (iii) the most (or fewest) total hours the one viewer has distributed any first video and/or second video so far, (iv) the most (or fewest) total hours the one viewer has viewed any first video and/or second video of any distributors so far, and/or (v) the highest (or lowest) ranks. The game object including the avatar of the viewer selected here (here, viewer X) is to be displayed as a boss character in ST912 described later.

Next, in ST908, the terminal device 10A resets (erases) the list of viewers generated so far. Thereafter, in ST910, the terminal device 10A starts to accumulate data related to a plurality of viewers to be new candidates (generates a list of new viewers), as in ST902 described above. The generation of this list can be continued until processing in ST916 is started.

Next, in ST912, the terminal device 10A executes a match (boss X match) between the own game object 504 and a boss character (important character having a very strong offensive power and physical power, as well as a complicated behavioral pattern) during the game. Here, the terminal device 10A can use the game object including the avatar of the viewer X selected in ST906 as a boss character. Also during ST912, the list of viewers mentioned in ST910 is continuously generated.

After the boss X match ends (the game object including the avatar of the viewer X is knocked down by the own game object 504), the terminal device 10A executes in ST914 a match (small-fry match) between the own game object 504 and a small-fry character during the game. In this small-fry match, the terminal device 10A can use the game object including the avatar of the viewer X selected in ST906 described above not as a boss character but as a wingman character (the game object that supports the own game object 504 and attacks the small-fry character). Also during ST914, the list of viewers mentioned in ST910 is continuously generated.

Next, in ST916, the terminal device 10A selects one viewer at random from among the list of viewers generated so far. The game object including the avatar of the viewer selected here (here, viewer Y) is to be displayed as a boss character in ST922 described later.

Next, in ST918, the terminal device 10A resets (erases) the list of viewers generated so far. Thereafter, in ST920, the terminal device 10A starts to accumulate data related to a plurality of viewers to be new candidates (generates a list of new viewers), as in ST902 and ST910 described above. The generation of this list can be continued until processing in ST926 is started.

Next, in ST922, the terminal device 10A executes a match (boss Y match) between the own game object 504 and the boss character during the game. Here, the terminal device 10A can use the game object including the avatar of the viewer Y selected in ST916 as a boss character. Also during ST922, the list of viewers mentioned in ST920 is continuously generated.

After the boss Y match ends (the game object including the avatar of the viewer Y is knocked down by the own game object 504), the terminal device 10A executes in ST924 a match (small-fry match) between the own game object 504 and a small-fry character during the game. In this small-fry match, the terminal device 10A can use the game object including the avatar of the viewer Y selected in ST916 described above not as a boss character but as a wingman character. Also during ST924, the list of viewers mentioned in ST920 is continuously generated.

Next, in ST926, the terminal device 10A selects one viewer at random from among the list of viewers generated so far. The game object including the avatar of the viewer selected here (here, viewer Z) is to be displayed as a boss character in the next boss match that is not shown.

Next, in ST928, the terminal device 10A resets (erases) the list of viewers generated so far. Hereinafter, the terminal device 10A can repeat the processing similar to that described above in relation to ST910 to ST918 (or ST920 to ST928).

Briefly speaking, the terminal device 10A first selects a specific viewer (viewer X) from among the plurality of viewers who generated (transmitted) token data in the "first period" in which the game is executed (ST906). Next, the terminal device 10A can display the game object including the avatar of the specific viewer (viewer X) on the second video in the "second period" occurring after the "first period". In this "second period", the terminal device 10A can display the game object including the avatar of the specific viewer (viewer X) as a boss character (ST912).

Next, the terminal device 10A can display the game object including the avatar of the specific viewer (viewer X) as a wingman character in the "third period" occurring after the "second period" (ST914).

Next, the terminal device 10A selects a specific viewer (viewer Y) from among the plurality of viewers who generated (transmitted) token data from the end of the "first period" to "third period" (ST916). Next, the terminal device 10A can display the game object including the avatar of the specific viewer (viewer Y) on the second video in the "fourth period" occurring after the "third period". In this "fourth period", the terminal device 10A can display the game object including the avatar of the specific viewer (viewer Y) as a boss character (ST922). Furthermore, the terminal device 10A can display the game object including the avatar of the specific viewer (viewer X) as a wingman character (ST922).

Next, the terminal device 10A can display the game object including the avatar of the specific viewer (viewer Y) as a wingman character in the "fifth period" occurring after the "fourth period" (ST924).

In each of ST906, ST916, and/or ST926 illustrated in FIG. 11, selection (lottery) of the specific viewer from among the plurality of viewers can be performed on the basis of data indicative of the activities illustrated below, stored for each of those plurality of viewers.

(1) Data indicative of the type of tokening (providing a paid/free token to the distributor) (e.g., when a paid token is given, a higher point is given, whereby the winning probability can be increased compared with that when a free token is given).

(2) Data indicative of the importance and/or infrequency (purchase price and/or consumption point (consumption My Point)) of the token given to the distributor (e.g., when a token of higher importance and/or infrequency is given, a higher point is given, whereby the winning probability can be increased compared with that when a token of lower importance and/or infrequency is given).

(3) Data indicative of the number of times (total number) of tokening to the distributor (e.g., the more the number of times of tokening, the higher the point is given, whereby the winning probability can be increased).

(4) Data indicative of the number of times of comments input (transmitted) to the distributor (e.g., the more the number of times of comments, the higher the point is given, whereby the winning probability can be increased).

(5) Data indicative of the number of times of "Like" input (transmitted) to the distributor (e.g., the more the number of times of "Like", the higher the point is given, whereby the winning probability can be increased).

(6) Data indicative of whether or not to be following the distributor (e.g., when the viewer is following the distributor, a higher point is given, whereby the winning probability can be increased).

(7) Data indicative of the number of distributors whom the viewer is following (e.g., the more the number of distributors whom the viewer is following, the higher the point is given, whereby the winning probability can be increased).

(8) Data indicative of the length of time and/or the number of times the viewer viewed the first video and/or the second video distributed by the distributor (e.g., the longer the viewing time is, the higher the point is given, whereby the winning probability can be increased).

(9) Data indicative of the number of times and/or the length of time the viewer distributed the first video and/or the second video in which the viewer played together with the distributor (e.g., the more the number of times is, the higher the point is given, whereby the winning probability can be increased).

Additionally, the "distributor" in the "data indicative of the activities" illustrated in (1) to (9) above stored for each viewer can include (i) a distributor who has actually distributed the second video to the viewer and has received token data from the viewer, (ii) a distributor who has previously distributed the second video to the viewer, and/or (iii) a distributor who has not yet distributed the second video to the viewer, without being limited thereto.

Specifically, for example, in a single lottery, for each of a plurality of viewers viewing the second video, a total point can be calculated by using data indicative of the activities stored for the viewer, and the viewer with the highest total point may be preferentially won as a specific viewer (if N specific viewers are selected in a single lottery, N viewers with the highest total points may be preferentially won as specific viewers).

The points can be calculated by any method from the data indicative of the activities corresponding to each of (1) to (9) above.

The target activities can include an activity executed in a period during which the second video illustrated in FIG. 11 is distributed and/or an activity executed in a period other than the period during which the second video illustrated in FIG. 11 is distributed.

In the example shown in FIG. 11, the game object including the avatar of the viewer won by the lottery is displayed as a wingman character after being displayed as a boss character, meanwhile in another example, a game object including the avatar of the viewer won by the lottery can be displayed as a boss character after being displayed as a wingman character.

Furthermore, in the example shown in FIG. 11, "only one" specific viewer is selected in ST906 (or ST916 or the like) and the game object including the avatar of the specific viewer selected in this manner is displayed in ST912 and ST914 (ST922, ST924, and the like). However, a plurality of specific viewers can be selected.

Thus, the terminal device 10A can select a specific viewer from among a plurality of viewers who have transmitted token data in a certain period of the game, and display the game object including the avatar of this specific viewer as a game object that supports or attacks the own game object in the next period occurring after the period. This allows the viewer won as a specific viewer to have a sense of being involved in the game which he/she is viewing, by the game character including his/her avatar being used as a boss character and/or a wingman character which can affect the success or failure of the game.

A game in which a boss character or a wingman character that acts as set by default appears tends to be monotonous in general. However, according to the technology disclosed in the present application, a specific viewer is selected from among a plurality of viewers, and a game object including the avatar of the selected specific viewer appears as a boss character and/or a wingman character in the second video. This allows the variation of the game to be increased, and it is hence possible to suppress the game from becoming monotonous.

Furthermore, since the terminal device 10A selects a specific viewer from among a plurality of viewers who are actually viewing the second video (game screen) in a certain period, a viewer who is viewing the second video is highly likely to be selected as a specific viewer sooner or later. This makes it easier for the viewer viewing the second video to be absorbed in viewing the game without getting bored with it.

Additionally, in the example shown in FIG. 11, the names "first period" to "fifth period" are used for convenience of explanation, but another period may occur between any two of those periods (e.g., between the first period and the second period, between the second period and the third period, and so forth).

6. Generation, Display, and Distribution of Ranking Data

A specific example of the ranking data described in relation to ST328 and ST330 in FIG. 5B will be described.

First of all, the video distribution system 1 disclosed in the present application can generate ranking data (first ranking data) related to the total value of points calculated on the basis of token data received from each viewer for each distributor, and transmit the ranking data to the terminal device 10 of each user (each distributor and/or each viewer).

This first ranking data can be generated for a certain game distributed by each distributor (e.g., one game sold or provided as a software application) (sum of a plurality of levels, stages, scenes, scenarios, and missions related to a certain game). Such the first ranking data can be displayed on each terminal device 10 as a table as shown in FIG. 12A, for example.

The first ranking data can be generated for a certain unit game (e.g., one level, one stage, one scene, one scenario, one mission, and so on) included in a certain game distributed by each distributor. Such the first ranking data can be displayed on each terminal device 10 as a table as shown in FIG. 12B, for example.

Furthermore, the first ranking data can be generated for all the games (sum of games of a plurality of types) distributed by each distributor in a unit period (e.g., an event period and periods such as one day, one week, and one month). Such the first ranking data can be displayed on each terminal device 10 as a table as shown in FIG. 12C, for example.

Such the first ranking data can be calculated with the following method by the ranking processing unit 170 of the terminal device 10 or the ranking processing unit 230 of the server device 20, for example.

When in a game (or unit game) distributed by the distributor A, the distributor A receives token data from the viewer B viewing the game, the ranking processing unit 170 (230) can acquire a token point or a ranking point stored in association with the token identification data included in the token data. Hence, in the game (or unit game) distributed by the distributor A, the ranking processing unit 170 (230) can acquire the total value of the token points and/or the ranking points for the distributor A by using the token data received from each viewer viewing the game. Which viewer to have transmitted the target token data is identified by the transmitter identification data included in the token data as described above. The "Distributor Name" illustrated in FIGS. 12A to 12C can be identified from the user data stored in the storage unit in association with the transmitter identification data.

The ranking processing unit 170 (230) can acquire the total value of the token points and/or the ranking points similarly for each of the other distributors. Thereafter, the ranking processing unit 170 (230) can acquire the first ranking data as illustrated in FIGS. 12A and 12B by arranging the total values of the token points and/or the ranking points for each distributor in descending order.

Furthermore, the ranking processing unit 170 (230) can acquire the first ranking data as illustrated in FIG. 12C by performing the processing same as that described above by limiting a game (or unit game) distributed by each distributor in a unit period (e.g., an event period and periods such as one day, one week, and one month).

Since the token data transmitted to the terminal device 10 of a certain distributor is also stored in the DB server device 20b similarly, such the first ranking data can be generated by either the ranking processing unit 170 of the terminal device 10 of the distributor or the ranking processing unit 230 of the server device 20. However, as described in Section "5-2", in the case where the value of the ranking point given to the distributor changes in accordance with the progress of the game distributed by the distributor, the value of the ranking point thus changed can normally be recognized only by the terminal device 10 of the distributor, and hence notification of the value of the ranking point thus changed needs to be provided from the terminal device 10 of the distributor to the DB server device 20b via the game API server device 20c, for example.

The first ranking data thus acquired may be distributed from the terminal device 10 of the distributor to each terminal device 10 via (the distribution server device 20a of) the distribution server system 20, or may be distributed from the distribution server system 20 to each terminal device 10 regardless of the operation of the terminal device 10 of the distributor.

Next, second, the video distribution system 1 disclosed in the present application can generate ranking data (second ranking data) related to the total value of points calculated on the basis of token data transmitted to a certain distributor for each viewer, and transmit the ranking data to the terminal device 10 of each user (each distributor and/or each viewer).

This second ranking data (also called support ranking data) can be generated for a certain game distributed by a certain distributor (e.g., one game sold or provided as a software application). Such the second ranking data can be displayed on each terminal device 10 as a table as shown in FIG. 13A, for example.

The second ranking data can be generated for a certain unit game (e.g., one or more levels, one or more stages, one or more scenes, one or more scenarios, one or more missions, and so on) included in a certain game distributed by a certain distributor. Such the second ranking data can be displayed on each terminal device 10 as a table as shown in FIG. 13B, for example.

Furthermore, the second ranking data can be generated for all the games distributed by any of the distributors in a unit period (e.g., periods such as one day, one week, and one month). Such the second ranking data can be displayed on each terminal device 10 as a table as shown in FIG. 13C, for example.

Such the second ranking data can be calculated with the following method by the ranking processing unit 170 of the terminal device 10 or the ranking processing unit 230 of the server device 20, for example.

When in a game (or unit game) distributed by the distributor A, the distributor A receives token data from the viewer B viewing the game, the ranking processing unit 170 (230) can acquire transmitter identification data and token identification data included in the token data, and can acquire a token point or a ranking point stored in association with this token identification data. This allows the ranking processing unit 170 (230) to acquire the total value of the token points and/or the ranking points for the viewer B by using all the token data received from the viewer B through the game (or unit game). The ranking processing unit 170 (230) can acquire the total value of the token points and/or the ranking points similarly for other viewers.

Thereafter, the ranking processing unit 170 (230) can acquire the second ranking data as illustrated in FIGS. 13A and 13B by arranging the total values of the token points and/or the ranking points for each viewer in descending order.

Furthermore, the ranking processing unit 170 (230) can acquire the second ranking data as illustrated in FIG. 13C by performing the processing same as that described above by limiting a game (or unit game) distributed by each distributor in a unit period.

Since the token data transmitted to the terminal device 10 of a certain distributor is also stored in the DB server device 20b similarly, such the second ranking data as illustrated in FIGS. 13A and 13B can be acquired by either the ranking processing unit 170 of the terminal device 10 of the distributor or the ranking processing unit 230 of the server device 20. However, the token data transmitted from the terminal device of each viewer to the terminal device 10 of "another" distributor is not automatically transferred to the terminal device 10 of a certain distributor, and hence, in order to generate the second ranking data as illustrated in FIG. 13C, the terminal device 10 of the certain distributor needs to request the token data transmitted to each distributor for the DB server device 20b via the game API server device 20c, for example.

The second ranking data thus acquired may be distributed from the terminal device 10 of the distributor to each terminal device 10 via (the distribution server device 20a of) the distribution server system 20, or may be distributed from the distribution server system 20 to each terminal device 10 regardless of the operation of the terminal device 10 of the distributor.

In the examples shown in FIGS. 12A to 12C, for the purpose of generating the first ranking data, the total values of the token points and/or the ranking points acquired by each distributor are compared, but instead of or in addition to this, the total values of the number of times each distributor has received token data from each viewer may be compared and displayed. Similarly, in the examples shown in FIGS. 13A to 13C, for the purpose of generating the second ranking data, the total values of the token points and/or the ranking points calculated from the token data received from each viewer are compared, but instead of or in addition to this, the total values of the number of times the token data is received from each viewer may be compared and displayed.

In a case where the generation, display, and distribution of the ranking data described in Section "6" are performed by the terminal device 10 of the distributor, the terminal device 10 can perform the above-mentioned operations required for the generation, display, and distribution of the ranking data (the first ranking data and/or the second ranking data) in accordance with the game program incorporated in the web page received from the web server device 20B.

Thus, in the first ranking data, if each viewer viewing the second video (video related to the game) distributed by a certain distributor transmits more token data to the distributor, the likelihood that the distributor is ranked higher and becomes famous will increase. For this reason, it is possible to improve the viewer's motivation to support the distributor. In the second ranking data, if each viewer viewing the second video (video related to the game) distributed by a certain distributor transmits more token data to the distributor, the likelihood that the viewer himself/herself is ranked higher will increase, and hence it is possible to increase the name recognition of the viewer himself/herself. Therefore, by transmitting the token data to a certain distributor, each viewer viewing the second video distributed by the distributor can indirectly have a sense of being involved in the game.

In either case of the first ranking or the second ranking, each user can browse a ranking screen (screen displaying the first ranking data and/or the second ranking data) on which a plurality of distributors and/or a plurality of viewers are listed by using the terminal device 10. Among the plurality of distributors and/or the plurality of viewers, there may be users not recognized by each user (e.g., not followed). This allows each user to obtain an opportunity to know a new user via this ranking screen, and hence the whole community can be activated.

The ranking screen may include detailed data related to each of the listed distributors and/or viewers (e.g., various data including name or nickname, age, sex, residential area, data indicative of the first video or the second video that has been distributed or viewed, interests, appealing messages, URLs related to websites or SNS, and so on, without being limited thereto). Furthermore, the ranking screen may include a button (UI) for following each of the listed distributors and/or viewers, a button (UI) for transmitting a direct message or starting a chat with each of the listed distributors and/or viewers, and/or a button (UI) for jumping to the website or SNS of each of the distributors and/or viewers.

7. Variations

The description of the various embodiments described above has presented the case where an HTML (particularly HTML5) document in which a game program is incorporated is received from the web server device 20B in order for the terminal device 10 of the distributor to generate a video (second video) related to the game. However, the terminal device 10 of the distributor can generate the second video including a screen related to the game by executing the installed video distribution application and receiving necessary data from a data server device not shown (or any server device not shown included in the distribution server system 20A), in place of the configuration in which an HTML document in which a game program is incorporated from the web server device 20B is received from the web server device 20B.

In the various embodiments described above, the terminal device 10 of the distributor may be a smartphone or the like used by a general user, or may be a dedicated terminal device installed in a studio or the like. In this case, at least one server device of the distribution server device 20a, the DB server device 20b, and the game API server device 20c that are included in the distribution server system 20A (as well as the web server device 20B) may be provided together with the dedicated terminal device in the studio or the like.

The description of the various embodiments described above has presented the case where a shooter game is used as an example of the game distributed as the second video. However, the technology disclosed in the present application is similarly applicable to a case of distributing any game in which any game object is displayed, such as a role-playing game, an action game, a simulation game, a social simulation game, and a puzzle game.

The description of the various embodiments described above has presented the case where the terminal device 10 of the distributor generates the first video including an animation of the first avatar of the distributor on the basis of motion data related to an action of the distributor and the voice data related to the voice of the distributor, and transmits the first video to the distribution server device 20a. However, the terminal device 10 of the distributor may transmit motion data related to the action of the distributor and voice data related to the voice of the distributor to the distribution server device 20a, and the distribution server device 20a may generate the first video on the basis of the motion data and the voice data and distribute the first video to the terminal device 10 of each viewer. Alternatively, the terminal device 10 of the distributor may transmit motion data related to the action of the distributor and voice data related to the voice of the distributor to a separately provided server device, the separate server device may generate the first video on the basis of the motion data and the voice data and return the first video to the terminal device 10 of the distributor, and the terminal device 10 of the distributor may transmit the received first video to the distribution server device 20a. Furthermore, the terminal device 10 of the distributor may transmit motion data related to the action of the distributor and voice data related to the voice of the distributor to the terminal device 10 of each viewer via the distribution server device 20a or the separately provided server device, and the terminal device 10 of each viewer may generate (render) and display the first video on the basis of the received motion data and voice data.

In any of the above cases, the generation of the first video on the basis of the motion data and the voice data transmitted by the terminal device 10 of the distributor may be shared by at least two of the distribution server device 20a, the separate server device, and the terminal device 10 of each viewer. In any case, the device in charge of generation of the first video can receive data (images and the like) related to the avatar to act from, for example, the distribution server device 20a and store the data.

Furthermore, in any case, token data and/or comment data transmitted by the terminal device 10 of each viewer can be transmitted by a given method to the device in charge of generation of the first video among the distribution server device 20a, the separate server device, and the terminal device 10 of each viewer. This allows the device that generates the first video to execute processing based on the received token data (e.g., displaying a token object (or gift object) on a first video) and/or to execute processing based on the received comment data (e.g., displaying a comment on the first video). In any case, the device in charge of generation of the first video can receive data (images and the like) corresponding to various tokens to be used from, for example, the distribution server device 20a and store the data.

The description of the various embodiments described above has presented the case where the comment data is transmitted from the terminal device 10 of the viewer to the terminal device 10 of the distributor via the distribution server system 20A in the form of being incorporated into the token data. However, the comment data may be transmitted to the terminal device 10 of the distributor separately from the token data. In this case, a configuration equivalent to the DB server device 20b and the game API server device 20c described above used for transmission of the token data can be separately provided for the purpose of transmission of the comment data.

In the various embodiments described above, when executing the video distribution application and communicating with the distribution server system 20A to distribute the first video, the terminal device 10A of the distributor A executes the browser function incorporated in the video distribution application, whereby the terminal device 10A can execute a program included in the web page received from the web server device 20B and distribute the second video to the terminal device 10 of each viewer via the distribution server system 20A. However, such configuration is merely an example.

For example, the terminal device 10A of the distributor A can also distribute the second video without distributing the first video. Specifically, in the first example, by executing the video distribution application and executing the browser function incorporated in the video distribution application, the terminal device 10A of the distributor A can execute a program included in the web page received from the web server device 20B (without distributing the first video by using the video distribution application), and distribute the second video to the terminal device 10 of each viewer via the distribution server system 20A. With this configuration, it is possible for the distributor A not to distribute the first video based on the performance of himself/herself but to distribute only the second video showing the state of the game executed by himself/herself.

In the second example, by executing an installed game application and accessing the distribution server system 20A, which also functions as a game server device, the terminal device 10A of the distributor A can distribute the screen of the game being executed to the terminal device 10 of each viewer via the distribution server system 20A.

In the third example, the terminal device 10A of the distributor A can transmit operation data of the distributor A to the web server device 20B or the distribution server system 20A without generating a game screen in the above-mentioned first example or the second example. In this case, the web server device 20B or the distribution server system 20A can generate a game screen by using the operation data of the distributor, and the distribution server system 20A can distribute the second video including the generated game screen to the terminal device 10 of each viewer.

Since the distribution server system 20A holds token data and/or comment data transmitted from each viewer to the distributor, the second video can be generated by using token data and/or comment data and the operation data by a technique similar to that performed by the terminal device 10 of the distributor. On the other hand, the web server device 20B does not hold token data and/or comment data transmitted from each viewer to the distributor. Therefore, the web server device 20B can acquire token data and/or comment data held by the distribution server system 20A from the distribution server system 20A, and can generate a second video by using this token data and/or comment data and the operation data. The web server device 20B can receive token data and/or comment data from the distribution server system 20A by using the above-described method performed by the terminal device 10 of the distributor with the distribution server system 20A.

The method of generating the second video by the web server device 20B or the distribution server system 20A can be the same as the method of generating the second video described above by the terminal device 10 of the distributor.

8. Example Computing Environment

Figure 14:
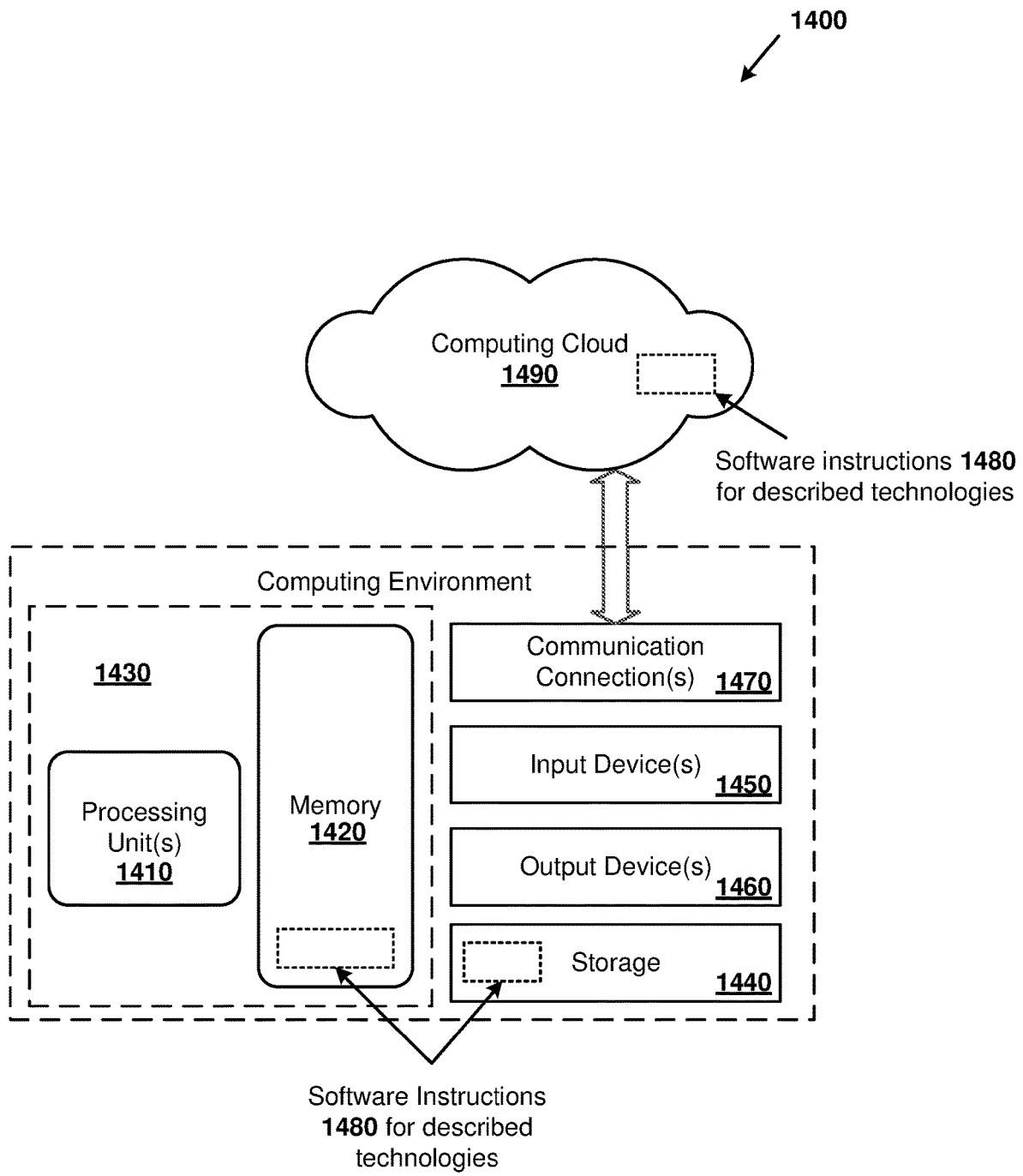
FIG. 14 is a diagram outlining an example computing environment in which disclosed methods and apparatus can be implemented.

FIG. 14 illustrates a generalized example of a suitable computing environment 1400 in which described embodiments, techniques, and technologies, including transmitting and using tokens to render video in a computing environment, can be implemented. For example, the computing environment 1400 can implement any of the terminal devices (or distributors or viewers) or the distribution server system, etc., as described herein.

The computing environment 1400 is not intended to suggest any limitation as to scope of use or functionality of the technology, as the technology may be implemented in diverse general-purpose or special-purpose computing environments. For example, the disclosed technology may be implemented with other computer system configurations, including hand-held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 14, the computing environment 1400 includes at least one central processing unit 1410 and memory 1420. In FIG. 14, this most basic configuration 1430 is included within a dashed line. The central processing unit 1410 executes computer-executable instructions and may be a real or a virtual processor. In a multi-processing system, multiple processing units execute computer-executable instructions to increase processing power and as such, multiple processors can be running simultaneously. The memory 1420 may be volatile memory (e.g., registers, cache, RAM), non-volatile memory (e.g., ROM, EEPROM, flash memory, etc.), or some combination of the two. The memory 1420 stores software 1480, images, and video that can, for example, implement the technologies described herein. A computing environment may have additional features. For example, the computing environment 1400 includes storage 1440, one or more input devices 1450, one or more output devices 1460, and one or more communication connections 1470. An interconnection mechanism (not shown) such as a bus, a controller, or a network, interconnects the components of the computing environment 1400. Typically, operating system software (not shown) provides an operating environment for other software executing in the computing environment 1400, and coordinates activities of the components of the computing environment 1400.

The storage 1440 may be removable or non-removable, and includes magnetic disks, magnetic tapes or cassettes, CD-ROMs, CD-RWs, DVDs, or any other medium which can be used to store information and that can be accessed within the computing environment 1400. The storage 1440 stores instructions for the software 1480, plugin data, and messages, which can be used to implement technologies described herein.

The input device(s) 1450 may be a touch input device, such as a keyboard, keypad, mouse, touch screen display, pen, or trackball, a voice input device, a scanning device, or another device, that provides input to the computing environment 1400. For audio, the input device(s) 1450 may be a sound card or similar device that accepts audio input in analog or digital form, or a CD-ROM reader that provides audio samples to the computing environment 1400. The output device(s) 1460 may be a display, printer, speaker, CD-writer, or another device that provides output from the computing environment 1400.

The communication connection(s) 1470 enable communication over a communication medium (e.g., a connecting network) to another computing entity. The communication medium conveys information such as computer-executable instructions, compressed graphics information, video, or other data in a modulated data signal. The communication connection(s) 1470 are not limited to wired connections (e.g., megabit or gigabit Ethernet, Infiniband, Fibre Channel over electrical or fiber optic connections) but also include wireless technologies (e.g., RF connections via Bluetooth, WiFi (IEEE 802.11a/b/n), WiMax, cellular, satellite, laser, infrared) and other suitable communication connections for providing a network connection for the disclosed agents, bridges, and destination agent data consumers. In a virtual host environment, the communication(s) connections can be a virtualized network connection provided by the virtual host.

Some embodiments of the disclosed methods can be performed using computer-executable instructions implementing all or a portion of the disclosed technology in a computing cloud 1490. For example, agents can be executing vulnerability scanning functions in the computing environment while agent platform (e.g., bridge) and destination agent data consumer service can be performed on servers located in the computing cloud 1490.

Computer-readable media are any available media that can be accessed within a computing environment 1400. By way of example, and not limitation, with the computing environment 1400, computer-readable media include memory 1420 and/or storage 1440. As should be readily understood, the term computer-readable storage media includes the media for data storage such as memory 1420 and storage 1440, and not transmission media such as modulated data signals.

In view of the many possible embodiments to which the principles of the disclosed subject matter may be applied, it should be recognized that the illustrated embodiments are only preferred examples and should not be taken as limiting the scope of the scope of the claims to those preferred examples. Rather, the scope of the claimed subject matter is defined by the following claims. We therefore claim as our invention all that comes within the scope of these claims.

What is claimed is:

1. Non-transitory computer-readable storage media storing computer-readable instructions, which when executed by a computer having at least one processor, cause the computer to:
   distribute, toward a terminal device of a viewer via a communication line: (1) a first video including an animation of a first avatar of a distributor generated on the basis of motion data or (2) motion data;
   distribute, toward the terminal device of the viewer via the communication line, a second video related to a computer-implemented game generated on the basis of operation data by using a received web page;
   receive, from the terminal device of the viewer via the communication line, token data indicative of a token sent to the distributor from the viewer viewing the second video;
   distribute, toward the terminal device of the viewer via the communication line, the second video including a plurality of game objects set on the basis of the token data, the plurality of game objects being integrated and displayed in accordance with a total number of the plurality of game objects; and
   give a point corresponding to the token data to the distributor or give a parameter corresponding to the token data to an own game object including a second avatar of the distributor if the own game object comes in contact with the plurality of game objects integrated and displayed in the second video.

2. The non-transitory computer-readable storage media according to claim 1, wherein the game object includes an avatar of the viewer who generated the token data.

3. The non-transitory computer-readable storage media according to claim 2, wherein the game object is an object that attacks an enemy character.

4. The non-transitory computer-readable storage media according to claim 2, wherein the game object is an enemy character that attacks an own game object including a second avatar of the distributor.

5. The non-transitory computer-readable storage media according to claim 3, wherein an offensive power of the game object is set on the basis of a point corresponding to the token data.

6. The non-transitory computer-readable storage media according to claim 1, wherein an own game object including a second avatar of the distributor has a parameter set on the basis of the token data.

7. The non-transitory computer-readable storage media according to claim 6, wherein the parameter is selected from a group including an offensive power, a defensive power, a physical power, a mobile power, equipment, and items.

8. The non-transitory computer-readable storage media according to claim 7, wherein the token data is generated by a plurality of viewers viewing the second video.

9. The non-transitory computer-readable storage media according to claim 1, wherein the game object is an object that gives a point corresponding to the token data to the distributor by interacting with an own game object including a second avatar of the distributor.

10. The non-transitory computer-readable storage media according to claim 1, wherein the instructions further cause the computer to distribute, toward the terminal device of the viewer via the communication line, the second video on which a plurality of game objects set on the basis of the token data are integrated and displayed in an aspect in accordance with a total number of the plurality of game objects.

11. The non-transitory computer-readable storage media according to claim 10, wherein
    the aspect is selected from a group including
    an aspect in which as many a representative game object as the total number overlaps,
    an aspect in which a representative game object is expressed by a density corresponding to the total number,
    an aspect in which a representative game object is expressed by a size corresponding to the total number, and
    an aspect in which a representative game object is expressed by a combination of the representative game object and text indicative of the total number.

12. The non-transitory computer-readable storage media according to claim 10, wherein each of the plurality of game objects is an object that gives a point corresponding to the token data to the distributor by interacting with an own game object including a second avatar of the distributor.

13. The non-transitory computer-readable storage media according to claim 10, wherein each of the plurality of game objects is an object that gives a parameter corresponding to the token data to an own game object including a second avatar of the distributor by interacting with the own game object.

14. The non-transitory computer-readable storage media according to claim 1, causing the processor to function so as to distribute the second video including a game object including an avatar of a specific viewer selected from among a plurality of viewers who generated the token data in a first period in which the game is to be executed, toward the terminal device of the viewer via the communication line in a second period occurring after the first period.

15. The non-transitory computer-readable storage media according to claim 14, wherein the game object is displayed on the second video as an enemy character that attacks an own game object including a second avatar of the distributor in the second period.

16. The non-transitory computer-readable storage media according to claim 15, wherein the game object is displayed on the second video as an object that attacks an enemy character in a third period occurring after the second period.

17. The non-transitory computer-readable storage media according to claim 16, wherein a game object including an avatar of a specific viewer selected from among a plurality of viewers who generated the token data from an end of the first period to the third period is displayed on the second video in a fourth period occurring after the third period.

18. The non-transitory computer-readable storage media according to claim 14, wherein selecting the specific viewer from among the plurality of viewers is executed on the basis of data indicative of an activity stored for each viewer included in the plurality of viewers.

19. The non-transitory computer-readable storage media according to claim 18, wherein
data indicative of an activity stored for each viewer of a plurality of viewers is selected from a group including:
data indicative of a type of a token given by the viewer to a distributor,
data indicative of an importance and/or a infrequency of a token given by the viewer to a distributor,
data indicative of the number of times the viewer gave a token to a distributor,
data indicative of the number of times of data input by the viewer to a distributor,
data indicative of whether the viewer follows a distributor,
data indicative of the number of distributors followed by the viewer,
data indicative of a length of time and/or the number of times the viewer viewed a first video and/or a second video distributed by a distributor, and
data indicative of the number of times and/or a length of time the viewer distributed a first video and/or a second video in which the viewer played together with a distributor.

20. The non-transitory computer-readable storage media according to claim 1, causing the processor to function so as to display at least one of first ranking data indicative of ranking related to the distributor having received the token data, and second ranking data indicative of ranking related to the viewer having transmitted the token data.

21. The non-transitory computer-readable storage media according to claim 20, wherein the first ranking data includes data related to a point calculated for the distributor by using token data received by the distributor from a plurality of viewers viewing the game.

22. The non-transitory computer-readable storage media according to claim 20, wherein the second ranking data includes data related to a point calculated, for each of a plurality of viewers viewing the game, by using the token data transmitted to the distributor by each of the plurality of viewers.

23. The non-transitory computer-readable storage media according to claim 20, wherein the first ranking data includes data related to a point calculated for the distributor by using token data received from a plurality of viewers viewing a plurality of games including the game by the distributor in a unit period.

24. The non-transitory computer-readable storage media according to claim 20, wherein the second ranking data includes data related to a point calculated, for each of the plurality of viewers viewing a plurality of games including the game in a unit period, by using token data transmitted to a plurality of distributors by each of the plurality of viewers.

25. A terminal device, comprising:
at least one processor, wherein the at least one processor:
distributes, toward a terminal device of a viewer via a communication line: (1) a first video including an animation of a first avatar of a distributor generated on the basis of motion data or (2) motion data,
distributes, toward the terminal device of the viewer via the communication line, a second video related to a game generated on the basis of operation data by using a received web page,
receives, from the terminal device of the viewer via the communication line, gift data indicative of providing a gift to the distributor from the viewer viewing the second video, and
distributes, toward the terminal device of the viewer via the communication line, the second video including a plurality of game objects set on the basis of the gift data, the plurality of game objects being integrated and displayed in accordance with a total number of the plurality of game objects; and
gives a point corresponding to the gift data to the distributor or gives a parameter corresponding to the gift data to an own game object including a second avatar of the distributor if the own game object comes in contact with the plurality of game objects integrated and displayed in the second video.

26. The terminal device according to claim 25, wherein the processor distributes, toward the terminal device of the viewer via the communication line, the second video on which a plurality of game objects set on the basis of the gift data are integrated and displayed in an aspect in accordance with a total number of the plurality of game objects.

27. The terminal device according to claim 25, wherein the processor distributes, toward the terminal device of the viewer via the communication line in a second period occurring after a first period, the second video including a game object including an avatar of a specific viewer selected from among a plurality of viewers who generated the gift data in the first period in which the game is to be executed.

28. The terminal device according to claim 25, wherein the processor displays at least one of first ranking data indicative of ranking related to the distributor having received the gift data, and second ranking data indicative of ranking related to the viewer having transmitted the gift data.

29. A computer-implemented method for automatically generating customized video in an interactive network application, the method comprising: with at least one processor:
transmitting, toward a terminal device of a viewer via a communication line: (1) a first video including an animation of a first avatar of a distributor generated on the basis of motion data or (2) motion data;

receiving a web page including at least a portion of a game program executable by a terminal device of the distributor;

executing the game program;

transmitting, toward the terminal device of the viewer via the communication line, a second video related to the game generated on the basis of operation data generated using the received web page;

receiving, from the terminal device of the viewer via the communication line, gift data indicative of providing a gift to the distributor from the viewer viewing the second video;

transmitting, toward the terminal device of the viewer via the communication line, the second video encoded with a rendering of a plurality of game objects set on the basis of the gift data, the plurality of game objects being integrated and displayed in accordance with a total number of the plurality of game objects; and giving a point corresponding to the gift data to the distributor or giving a parameter corresponding to the gift data to an own game object including a second avatar of the distributor if the own game object comes into contact with the plurality of game objects integrated and displayed in the second video.

30. The method according to claim 29, further comprising delivering, toward the terminal device of the viewer via the communication line, the second video on which a plurality of game objects set on the basis of the gift data are integrated and displayed in an aspect in accordance with a total number of the plurality of game objects.

31. The method according to claim 29, further comprising transmitting the second video including a game object including an avatar of a specific viewer selected from among a plurality of viewers who generated the gift data in a first period in which the game is to be executed, toward the terminal device of the viewer via the communication line in a second period occurring after the first period.

32. The method according to claim 29, further comprising a step of displaying at least one of first ranking data indicative of ranking related to the distributor having received the gift data, and second ranking data indicative of ranking related to the viewer having transmitted the gift data.

* * * * *